(12) United States Patent
Mourad et al.

(10) Patent No.: US 9,903,070 B2
(45) Date of Patent: *Feb. 27, 2018

(54) INDUSTRIAL FABRIC FOR PRODUCTION OF NONWOVENS, AND METHOD OF MAKING THEREOF

(75) Inventors: Sabri Mourad, Chatenois (FR); Jonas Karlsson, Halmstad (SE)

(73) Assignee: Albany International Corp., Rochester, NH (US)

( * ) Notice: Subject to any disclaimer, the term of this patent is extended or adjusted under 35 U.S.C. 154(b) by 1200 days.

This patent is subject to a terminal disclaimer.

(21) Appl. No.: 12/695,007

(22) Filed: Jan. 27, 2010

(65) Prior Publication Data

US 2010/0239814 A1    Sep. 23, 2010

Related U.S. Application Data

(60) Provisional application No. 61/147,894, filed on Jan. 28, 2009.

(51) Int. Cl.
  *D21G 9/00* (2006.01)
  *B32B 3/26* (2006.01)
  (Continued)

(52) U.S. Cl.
  CPC ............ *D21G 9/00* (2013.01); *B23K 26/384* (2015.10); *B32B 3/266* (2013.01); *B32B 5/022* (2013.01);
  (Continued)

(58) Field of Classification Search
  CPC ..... B29C 67/00; B29C 66/71; B29C 47/0021; B29C 47/0028; B29C 47/003;
  (Continued)

(56) References Cited

U.S. PATENT DOCUMENTS 1,925,917 A * 9/1933 Chalon .................. 428/132
2,862,251 A   12/1958 Kalwaites
(Continued)

FOREIGN PATENT DOCUMENTS

DE    25 38 691 A    3/1977
DE     3444082 A    8/1986
(Continued)

OTHER PUBLICATIONS

International Search Report and Written Opinion from EPO for PCT/US2008/076647.
(Continued)

*Primary Examiner* — Brian Handville
(74) *Attorney, Agent, or Firm* — McCarter & English, LLP

(57) ABSTRACT

An industrial fabric such as an endless belt or sleeve for use in the production of nonwovens, and a method of making thereof are disclosed. The fabric includes a plurality of through voids, where each of the voids has a first opening associated with a top surface of the fabric and a first raised edge circumferentially adjacent to the first opening. The voids may each further include a second opening associated with a bottom surface of the fabric and a second raised edge circumferentially adjacent to the second opening, such that the first opening may have a surface area that is larger than or the same as the second opening.

27 Claims, 22 Drawing Sheets

(51) Int. Cl.

| | | |
|---|---|---|
| *B32B 5/26* | (2006.01) | |
| *D04H 1/44* | (2006.01) | |
| *D04H 1/46* | (2012.01) | |
| *D04H 5/02* | (2012.01) | |
| *D21F 1/00* | (2006.01) | |
| *D21F 11/14* | (2006.01) | |
| *B23K 26/384* | (2014.01) | |
| *B32B 5/02* | (2006.01) | |
| *B32B 5/08* | (2006.01) | |
| *B32B 5/22* | (2006.01) | |

(52) U.S. Cl.
CPC ............... *B32B 5/08* (2013.01); *B32B 5/22* (2013.01); *B32B 5/26* (2013.01); *D04H 1/44* (2013.01); *D04H 1/46* (2013.01); *D04H 5/02* (2013.01); *D21F 1/0036* (2013.01); *D21F 1/0063* (2013.01); *D21F 11/14* (2013.01); *B32B 2255/02* (2013.01); *B32B 2255/26* (2013.01); *B32B 2262/02* (2013.01); *B32B 2262/0253* (2013.01); *B32B 2262/0261* (2013.01); *B32B 2262/0269* (2013.01); *B32B 2262/0276* (2013.01); *B32B 2262/12* (2013.01); *B32B 2262/14* (2013.01); *B32B 2307/50* (2013.01); *B32B 2307/726* (2013.01); *B32B 2413/00* (2013.01); *Y10T 83/0481* (2015.04); *Y10T 428/24273* (2015.01); *Y10T 428/24281* (2015.01)

(58) Field of Classification Search
CPC ..... B29C 47/0033; B29C 41/12; B29C 59/04; B32B 3/10; B32B 3/266; B32B 27/12; B32B 3/30; B32B 2307/724; B32B 3/28; B32B 2307/726; B41C 1/05; B41C 1/1025; B41C 1/1033; B41N 1/12; Y10S 162/902; B29D 28/00
USPC ........ 428/131, 134, 132; 162/110, 116, 348, 162/362, 903; 425/174.5; 264/400
See application file for complete search history.

(56) References Cited

U.S. PATENT DOCUMENTS

| | | | |
|---|---|---|---|
| 3,121,660 A | 2/1961 | Hall, Jr. | |
| 3,323,226 A | 5/1963 | Beaumont et al. | |
| 3,214,819 A | 11/1965 | Guerin | |
| 3,399,111 A | 12/1966 | Beaumont et al. | |
| 3,485,706 A | 12/1969 | Evans | |
| 3,508,308 A | 4/1970 | Bunting, Jr. et al. | |
| 3,509,007 A * | 4/1970 | Kalwaites | 428/132 |
| 4,085,485 A | 4/1978 | Brandon et al. | |
| 4,206,258 A | 6/1980 | Balcar | |
| 4,446,187 A * | 5/1984 | Eklund | 428/136 |
| 4,537,658 A | 8/1985 | Albert | |
| 4,541,895 A | 9/1985 | Albert | |
| 4,849,054 A | 7/1989 | Klowak | |
| 5,098,764 A | 3/1992 | Drelich et al. | |
| 5,208,087 A | 5/1993 | Stigberg | |
| 5,244,711 A | 9/1993 | Drelich et al. | |
| 5,245,025 A | 9/1993 | Trokhan et al. | |
| 5,281,461 A | 1/1994 | Greenway et al. | |
| 5,298,124 A | 3/1994 | Eklund et al. | |
| 5,336,373 A | 9/1994 | Scattolino et al. | |
| 5,393,384 A | 2/1995 | Steiner et al. | |
| 5,445,746 A | 8/1995 | Lee | |
| 5,549,193 A | 8/1996 | Schlueter, Jr. et al. | |
| 5,679,222 A | 10/1997 | Rasch et al. | |
| 5,713,399 A | 2/1998 | Collette et al. | |
| 5,718,022 A | 2/1998 | Vuillaume | |
| 5,730,817 A | 3/1998 | Feygin et al. | |
| 5,768,756 A | 6/1998 | Noelle | |
| 5,814,349 A | 9/1998 | Geus et al. | |
| 5,827,597 A | 10/1998 | James et al. | |
| 5,837,102 A | 11/1998 | Graf | |
| 5,900,122 A | 5/1999 | Huston | |
| 5,906,786 A | 5/1999 | James et al. | |
| 5,916,462 A | 6/1999 | James et al. | |
| 5,972,813 A | 10/1999 | Polat et al. | |
| 6,010,598 A | 1/2000 | Boutilier et al. | |
| 6,120,642 A | 9/2000 | Lindsay et al. | |
| 6,124,015 A | 9/2000 | Baker et al. | |
| 6,159,880 A | 12/2000 | Schiel | |
| 6,171,447 B1 | 1/2001 | Trokhan | |
| 6,274,042 B1 | 8/2001 | Beck | |
| 6,290,818 B1 | 9/2001 | Romanski | |
| 6,331,341 B1 | 12/2001 | Joyce | |
| 6,340,413 B1 | 1/2002 | Nilsson et al. | |
| 6,358,594 B1 | 3/2002 | Ampulski | |
| 6,436,240 B1 | 8/2002 | Jeffrey | |
| 6,461,474 B1 | 10/2002 | Lindsay et al. | |
| 6,547,924 B2 | 4/2003 | Klerelid et al. | |
| 6,610,173 B1 | 8/2003 | Lindsay et al. | |
| 6,616,812 B2 | 9/2003 | Beck | |
| 6,616,814 B2 | 9/2003 | Best | |
| 6,630,223 B2 * | 10/2003 | Hansen | 428/131 |
| 6,660,362 B1 | 12/2003 | Hansen | |
| 6,712,940 B2 | 3/2004 | Crook | |
| 6,723,208 B1 | 4/2004 | Hansen | |
| 6,743,339 B1 | 6/2004 | Nilsson et al. | |
| 6,743,571 B1 | 6/2004 | Hill et al. | |
| 6,780,282 B2 | 8/2004 | Scherb et al. | |
| 6,865,784 B2 | 3/2005 | Nolle | |
| 6,875,315 B2 | 4/2005 | Bakken et al. | |
| 6,878,238 B2 | 4/2005 | Bakken et al. | |
| 6,998,017 B2 | 2/2006 | Lindsay et al. | |
| 7,005,044 B2 | 2/2006 | Kramer et al. | |
| 7,008,513 B2 | 3/2006 | Davenport et al. | |
| 7,014,735 B2 | 3/2006 | Kramer et al. | |
| 7,022,208 B2 | 4/2006 | Davenport et al. | |
| 7,128,809 B2 | 10/2006 | Viinson et al. | |
| 7,128,810 B2 | 10/2006 | Hansen | |
| 7,141,142 B2 | 11/2006 | Burazin et al. | |
| 7,144,479 B2 * | 12/2006 | Davis et al. | 162/358.2 |
| 7,166,196 B1 | 1/2007 | Kramer et al. | |
| 7,169,265 B1 | 1/2007 | Kramer et al. | |
| 7,294,237 B2 | 11/2007 | Herman et al. | |
| 7,294,238 B2 | 11/2007 | Bakken et al. | |
| 7,297,233 B2 | 11/2007 | Herman et al. | |
| 7,410,554 B2 | 8/2008 | Davenport | |
| 7,491,297 B2 | 2/2009 | Serr et al. | |
| 7,494,571 B2 | 2/2009 | Takamura | |
| 7,501,044 B2 | 3/2009 | Hikida et al. | |
| 7,504,060 B2 | 3/2009 | Brock et al. | |
| 7,524,403 B2 | 4/2009 | Fernandes et al. | |
| 7,527,709 B2 | 5/2009 | Lippi Alves Fernandes et al. | |
| 7,540,942 B2 | 6/2009 | Hikita | |
| 7,550,061 B2 | 6/2009 | Walkenhaus et al. | |
| 2003/0087575 A1 | 5/2003 | Carlson et al. | |
| 2003/0145444 A1 | 8/2003 | Schmitz | |
| 2004/0069432 A1 | 4/2004 | Hansen | |
| 2004/0116031 A1 | 6/2004 | Brennan et al. | |
| 2004/0118545 A1 | 6/2004 | Bakken et al. | |
| 2004/0118546 A1 | 6/2004 | Bakken et al. | |
| 2005/0167062 A1 | 8/2005 | Herman et al. | |
| 2007/0134467 A1 | 6/2007 | Sayers | |
| 2007/0167099 A1 | 7/2007 | Patel et al. | |
| 2007/0246119 A1 | 10/2007 | Herman | |
| 2007/0298213 A1 * | 12/2007 | Noda et al. | 428/131 |

FOREIGN PATENT DOCUMENTS

| | | |
|---|---|---|
| DE | 19548747 A | 7/1997 |
| EP | 1393 426 | 9/1972 |
| EP | 0037387 | 10/1981 |
| EP | 0103376 | 7/1983 |
| EP | 147904 | 7/1985 |
| EP | 0337451 | 10/1989 |
| EP | 0446432 A1 | 9/1991 |
| EP | 0 705 933 A | 4/1996 |
| EP | 0 972 876 A2 | 1/2000 |
| EP | 1 040 223 B | 2/2003 |

(56) References Cited

FOREIGN PATENT DOCUMENTS

| | | | |
|---|---|---|---|
| EP | 0868251 | | 11/2004 |
| EP | 1566259 | | 8/2005 |
| EP | 1 339 915 | B | 7/2007 |
| FR | 1460513 | | 10/1966 |
| FR | 2730246 | A | 8/1996 |
| FR | 2734285 | A | 11/1996 |
| GB | 995620 | | 6/1965 |
| GB | 1037003 | | 7/1966 |
| GB | 1393426 | | 5/1975 |
| GB | 1515455 | | 6/1978 |
| GB | 1025000 | | 4/1996 |
| JP | 61020686 | | 1/1986 |
| JP | 06-170959 | | 6/1994 |
| JP | 2001-288671 | * | 10/2001 |
| JP | 2001-288671 | A | 10/2001 |
| WO | WO 86/05219 | A | 9/1986 |
| WO | WO 92/17643 | A | 10/1992 |
| WO | WO 95/21285 | A | 8/1995 |
| WO | WO 98/00605 | A | 1/1998 |
| WO | WO 98/01618 | A | 1/1998 |
| WO | WO 99/10597 | A | 3/1999 |
| WO | WO 02/40769 | A | 5/2002 |
| WO | WO 02/41815 | | 5/2002 |
| WO | WO 2004/038093 | | 5/2004 |
| WO | WO 2005/042836 | | 5/2005 |
| WO | WO 2005/087997 | A | 9/2005 |
| WO | WO 2005/116332 | A | 12/2005 |
| WO | WO 2008/006870 | A | 1/2008 |
| WO | WO 2010/030298 | | 3/2010 |
| WO | WO-2010/030570 | A | 3/2010 |
| WO | WO-2010/068765 | | 6/2010 |

OTHER PUBLICATIONS

International Search Report and Written Opinion from EPO for PCT/US2009/056007.
International Search Report and Written Opinion from EPO for PCT/US2009/055751.
International Search Reportand Written Opinion from EPO for PCT/US2010/022250.

* cited by examiner

6th PASS

7th PASS

1010 ↗ 1014

1012 ↗ 1016

INDUSTRIAL FABRIC FOR PRODUCTION OF NONWOVENS, AND METHOD OF MAKING THEREOF

CROSS-REFERENCE TO RELATED APPLICATIONS

This application claims priority benefit of U.S. Provisional Patent Application No. 61/147,894, filed Jan. 28, 2009.

INCORPORATION BY REFERENCE

All patents, patent applications, documents, references, manufacturer's instructions, descriptions, product specifications, and product sheets for any products mentioned herein are incorporated by reference herein, and may be employed in the practice of the invention.

BACKGROUND OF THE INVENTION

1. Field of the Invention

The present invention is directed to endless fabrics, and particularly, industrial fabrics used in the production of nonwoven products. More particularly, the instant invention is directed to support members such as belts or sleeves used in the production of patterned or marked nonwoven products. Furthermore, the present invention may be used as a belt and/or sleeve used in the production of nonwovens by processes such as airlaid, melt blowing, spunbonding, and hydroentangling.

2. Description of the Prior Art

Processes for making nonwoven products have been known for many years. In one process, a fiber batt or web is treated with water streams or jets to cause the fibers to entangle with each other and improve the physical properties, such as strength, of the web. Such techniques for treatment by means of water jets have been known for decades, as may be gathered from the disclosures of U.S. Pat. Nos. 3,214,819, 3,508,308 and 3,485,706.

In general terms, this method involves interlacing of elementary fibers with one another by means of the action of water jets under pressure, which act on the fibrous structure like needles and make it possible to reorient part of the fibers forming the web in the thickness direction.

Such technology has been widely developed at the present time and is used not only for producing what are known as "spunlaced" or "hydroentangled" structures for textile use, such as, in particular for applications in medical fields and hospitals, for wiping, filtration and wrappings for teabags, and the articles obtained may be regular and homogeneous, as may be gathered from the disclosure of U.S. Pat. No. 3,508,308, and if required, comprise designs resulting from the reorientation of the fibers, this being essential for an esthetic purpose, as may be gathered from the disclosure of U.S. Pat. No. 3,485,706.

As to products of the "spunlace" or "hydroentangled" type, it has been known for a very long time that the final properties of the product can be adapted by producing mixtures of material, for example by combining a plurality of webs consisting of fibers of different types, for example of natural, artificial or synthetic fibers, or even webs in which the fibers are previously mixed (webs of the "spunbond" type, etc.) with reinforcements that can be incorporated into the nonwoven structure.

French patents FR-A-2 730 246 and 2 734 285, corresponding respectively to U.S. Pat. No. 5,718,022 and U.S. Pat. No. 5,768,756, describe solutions which make it possible to successfully treat hydrophobic fibers or mixtures of these fibers with other hydrophilic fibers or even webs consisting entirely of natural fibers by means of water jets.

In general terms, according to the teachings of these documents, the treatment involves treating a basic web composed of elementary fibers of the same type or of different types, compressing and moistening this basic web and then intermingling the fibers by means of at least one rack of contiguous jets of water under high pressure acting on the basic web.

For this purpose, the basic web is advanced positively on an endless porous support in motion, and it is brought onto the surface of a perforated rotary cylindrical drum, to the interior of which a partial vacuum is applied. The basic web is compressed mechanically between the porous support and the rotary drum which both advance substantially at the same speed. Immediately downstream of the compression zone, a water curtain is directed onto the web and passes successively through the porous support, the compressed basic web and the supporting perforated drum wherein a vacuum source removes the excess water.

The elementary fibers are intermingled continuously, still on the rotary cylindrical drum, by the compressed and wetted web being subjected to the action of at least one rack of jets of water under high pressure. In general, bonding is carried out by means of a plurality of successive racks of water jets which act either on the same face or alternately against the two faces of the web, the pressure within the racks and the velocity of the jets discharged varying from one rack to the next and usually progressively.

It is important to note, as may be gathered from FR 2 734 285, that the perforated roller/drum may comprise randomly distributed micro-perforations. If required, after the initial bonding treatment, the fibrous nonwoven structure may be subjected to a second treatment applied to the reverse face.

In the process of producing spunlaced or hydroentangled nonwoven products, it is often desired to impart a pattern or mark on the finished product, thereby creating a desired design on the product. This pattern or mark is typically developed using a secondary process, separate from the nonwoven sheet forming and roll-up process, where an embossed/patterned calendar roll is used. These rolls are typically expensive and operate on the principle of compressing certain areas of the fibrous web to create the required patterns or marks. However, there are several drawbacks of using a separate process for creating the pattern or mark on the nonwoven product. For example, a high initial investment for calendar rolls would be required, which can limit the length of production runs that can be economically justified by a producer. Second, higher processing costs would be incurred due to a separate patterning or marking stage. Third, the final product would have a higher than required material content to maintain product caliper (thickness) after compression in the calendaring step. Lastly, the two-stage process would lead to a lower bulk in the finished product than desired due to high pressure compression during calendaring. Prior art nonwoven products made with these known patterning processes do not have clear, well defined raised portions and therefore the desired patterns are difficult to see. In addition, the raised portions of prior art embossed nonwoven products are not dimensionally stable and their raised portions tend to lose their three-dimensional structure when stressed after a period of time depending on the application.

U.S. Pat. Nos. 5,098,764 and 5,244,711 disclose the use of a support member in a more recent method of producing nonwoven webs or products. The support members have a topographical feature configuration as well as an array of apertures. In this process, a starting web of fiber is positioned on the topographical support member. The support member with the fibrous web thereon is passed under jets of high pressure fluid, typically water. The jets of water cause the fiber to intertwine and entangle with each other in a particular pattern, based on the topographical configuration of the support member.

The pattern of topographical features and apertures in the support member is critical to the structure of the resulting nonwoven product. In addition, the support member must have sufficient structural integrity and strength to support a fibrous web while fluid jets rearrange the fibers and entangle them in their new arrangement to provide a stable fabric. The support member must not under go any substantial distortion under the force of the fluid jets. Also, the support member must have means for removing the relatively large volumes of entangling fluid so as to prevent "flooding" of the fibrous web, which would interfere with effective entangling. Typically, the support member includes drainage apertures which must be of a sufficiently small size to maintain the integrity of the fibrous web and prevent the loss of fiber through the forming surface. In addition, the support member should be substantially free of burrs, hooks or the like irregularities that could interfere with the removal of the entangled fibrous nonwoven therefrom. At the same time, the support member must be such that fibers of the fibrous web being processed thereon are not washed away (i.e. good fiber retention and support) under the influence of the fluid jets.

One of the main problems which arises during the production of nonwovens is that of achieving the cohesion of the fibers making up the nonwoven in order to give the nonwoven products the strength characteristics according to the application in question, while maintaining or imparting particular physical characteristics, such as bulk, hand, appearance, etc.

The properties of bulk, absorbency, strength, softness, and aesthetic appearance are indeed important for many products when used for their intended purpose. To produce a nonwoven product having these characteristics, a support member will often be constructed such that the sheet contact surface exhibits topographical variations.

It should be appreciated that these support members (fabrics, belts, sleeves) may take the form of endless loops and function in the manner of conveyors. It should further be appreciated that nonwoven production is a continuous process which proceeds at considerable speeds. That is to say, the elementary fibers or webs may be continuously deposited onto a forming fabric/belt in the forming section, while a newly entangled nonwoven fabric is continuously being transferred from the support member to a subsequent process.

The instant invention provides for belts and sleeves that function in place of traditional woven fabrics, and impart desired texture, hand, and bulk to the nonwoven products produced thereon.

SUMMARY OF THE INVENTION

It is therefore a principal object of the present invention to provide an improved belt or sleeve that imparts desired texture, hand, bulk, appearance, absorbency, and strength to the nonwoven products produced thereon.

Yet another object of the invention is to provide a spunlacing or hydroentangling support member such as a belt or sleeve that has through voids in a desired pattern. The support member may also be used as a process belt or sleeve in airlaid, melt blowing or spunbonding processes.

It is a further object to provide a belt or sleeve that may have a topography or texture on one or both surfaces due to the pattern of through holes or voids. These and other objects and advantages are provided by the instant invention. Other advantages such as, but not limited to, improved fiber support and release (no picking) over prior art woven fabrics, and easier cleanability as a result of no yarn crossovers to trap elementary fibers are provided. The surface texture of the belt or sleeve results in more effective patterning/texture being transferred to the nonwoven, and it also results in better physical properties such as bulk/absorbency.

The present invention relates to an endless support member such as a belt or sleeve for supporting and conveying natural, artificial or synthetic fibers in a spunlace or hydroentanglement process. The instant porous structures, belts, or sleeves exhibit the following non-limiting advantages over calendaring technology: fabric sleeves are a relatively less expensive item with no large capital investment in fixed equipment; patterning is accomplished during the entangling process itself, eliminating the need for a separate calendaring process; lower material content in the final product can be achieved as caliper/thickness is not degraded from compression; the finished product can be produced with higher bulk as it is not compressed at a calendaring stage. To the nonwoven rolled-goods producer, these process advantages further lead to the end product advantages of: lower cost spunlace or hydroentangled webs with desired patterns, marks, or texture; the ability to customize products as the size/length of the production run for particular products is reduced; production of higher performance products, such as, products with high bulk imparts the characteristic of higher absorbency, which is of great value in consumer applications.

The invention therefore, according to one exemplary embodiment, is an industrial fabric, such as a belt or sleeve, including a plurality of through voids. The through voids each have a first opening associated with a top surface of the fabric, a second opening associated with a bottom surface of the fabric, and at least one raised edge circumferentially adjacent to at least one of the first and second openings.

Another exemplary embodiment of the present invention is a system for producing through voids in an industrial fabric, such as a belt or sleeve. The system includes an optical source operable to generate incident optical radiation, a drive unit coupled to the optical source and adapted to control at least one characteristic associated with the incident optical radiation, and an apparatus operable to retain the fabric and facilitate relative motion between the optical source and the fabric such that the incident optical radiation perforates the fabric and generates the through voids. The through voids include at least one raised edge circumferentially adjacent to an opening created on at least one of top and bottom surfaces associated with the fabric.

Another exemplary embodiment of the present invention is a method of generating through voids in an industrial fabric, such as a belt or sleeve. The method includes the steps of producing a first opening associated with a top surface of the fabric, producing a second opening associated with a bottom surface of the fabric, and producing at least one raised edge circumferentially adjacent to at least one of the first and second opening.

Yet another exemplary embodiment of the present invention is a method of generating through voids in an industrial fabric, such as a belt or sleeve. The method includes the steps of generating incident optical radiation for impacting the fabric, and controlling at least one characteristic associated with the incident optical radiation such that the incident optical radiation generates through voids that each include at least one raised edge circumferentially adjacent to an opening created on at least one of top and bottom surfaces associated with the fabric.

Yet another exemplary embodiment of the present invention is an industrial fabric, such as a belt or sleeve, including one or more spirally wound strips of polymeric material, wherein adjacent strips of the spirally wound strips of polymeric material are coupled. The spirally wound strips comprise a plurality of through voids each having a first opening associated with a top surface of the fabric, a second opening associated with a bottom surface of the fabric, and at least one raised edge circumferentially adjacent to at least one of the first and second openings.

Yet another exemplary embodiment of the present invention is an industrial fabric, such as a belt or sleeve, including strips of polymeric material spirally wound such that adjacent strips of the polymeric material are coupled to form a belt, and a plurality of through voids distributed over the formed belt, wherein the plurality of through voids comprise at least one raised edge circumferentially adjacent to at least one of a first and second opening associated with each of the plurality of distributed through voids.

While the term fabric and fabric structure is used, fabric, belt, conveyor, sleeve, support member, and fabric structure are used interchangeably to describe the structures of the present invention. Similarly, the terms strip of material, and material strips are used interchangeably throughout the description.

The various features of novelty which characterize the invention are pointed out in particularity in the claims annexed to and forming a part of this disclosure. For a better understanding of the invention, its operating advantages and specific objects attained by its uses, reference is made to the accompanying descriptive matter in which preferred embodiments of the invention are illustrated in the accompanying drawings in which corresponding components are identified by the same reference numerals.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF THE PREFERRED EMBODIMENTS

The instant invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art.

Figure 4A:
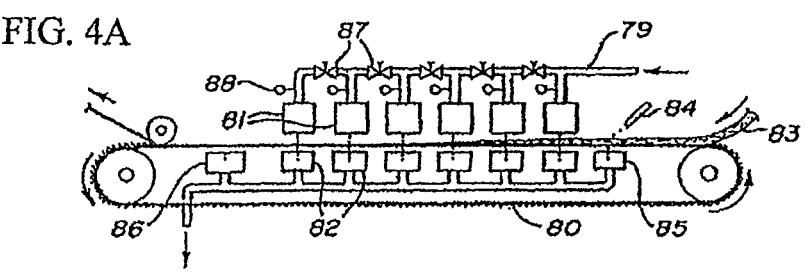
FIGS. 4A & 4B are schematic views of different types of apparatus for producing nonwoven webs using the fabric, belt or sleeve of the present invention.

The present invention provides a continuous support member such as an endless belt for use in the apparatus shown in FIG. 4(a), for example. While the description that follows is primarily for spunlacing process and fabrics or belts used therein, the application is not so limited. The inventive belt/sleeves are useful for other nonwoven processes, such as for example airlaid, melt blowing or spunbonding processes. The nonwoven support member functions in place of a traditional woven support member, and imparts desired texture, hand, and bulk to the nonwoven products produced thereon. The support member of the present invention may reduce the manufacturing time and costs associated with the production of nonwovens.

Figure 4B:
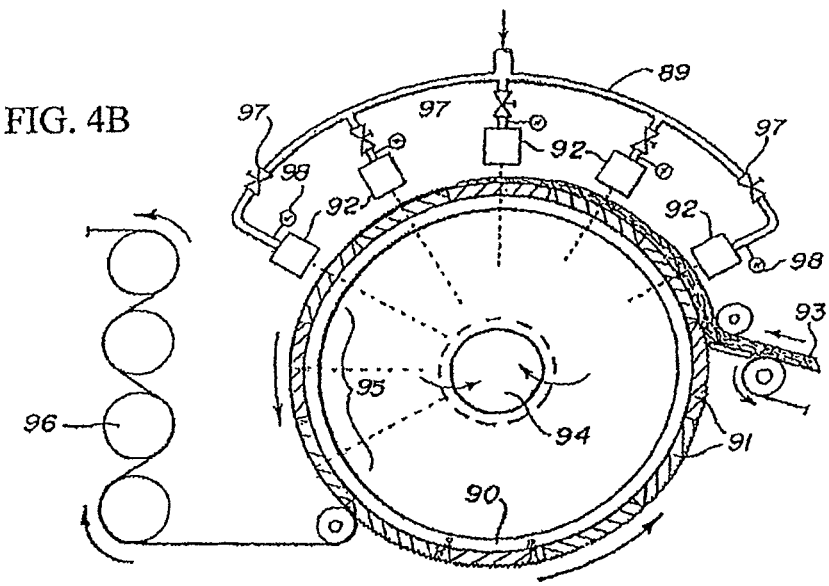

FIG. 4(a) depicts an apparatus for continuously producing nonwoven fabrics using a support member in accordance with the present invention. The apparatus of FIG. 4(a) includes a conveyor belt 80 which actually serves as the topographical support member in accordance with the present invention. The belt is continuously moved in a counter-clockwise direction about a pair of spaced-apart rollers as is well known in the art. Disposed above belt 80 is a fluid ejecting manifold 79 connecting a plurality of lines or groups 81 of orifices. Each group has one or more rows of very fine diameter orifices, each about 0.007 inch in diameter with 30 such orifices per inch. Water is supplied to the groups 81 of orifices under a predetermined pressure and is ejected from the orifices in the form of very fine, substantially columnar, non-diverging streams or jets of water. The manifold is equipped with pressure gauges 88 and control valves 87 for regulating the fluid pressure in each line or group of orifices. Disposed beneath each orifice line or group is a suction box 82 for removing excess water, and to keep the area from undue flooding. The fiber web 83 to be formed into the nonwoven product is fed to the topographical support member conveyor belt of the present invention. Water is sprayed through an appropriate nozzle 84 onto the fibrous web to pre-wet the incoming web 83 and aid in controlling the fibers as they pass under the fluid ejecting manifolds. A suction slot 85 is placed beneath this water nozzle to remove excess water. Fibrous web passes under the fluid ejecting manifold in a counter clockwise direction. The pressure at which any given group 81 of orifices is operated can be set independently from the pressure at which any of the other groups 81 of orifices is operated. Typically, however, the group 81 of orifices nearest spray nozzle 84 is operated at a relatively low pressure, e.g. 100 psi. This assists in settling the incoming web onto the surface of the support member. As the web passes in the counterclockwise direction in FIG. 4(*a*), the pressures at which the groups 81 of orifices are operated is usually increased. It is not necessary that each succeeding group 81 of orifices be operated at a pressure higher than its neighbor in the clockwise direction. For example, two or more adjacent groups 81 of orifices could be operated at the same pressure, after which the next succeeding group 81 of orifices (in the counterclockwise direction) could be operated at a different pressure. Very typically, the operating pressures at the end of the conveyor belt where the web is removed are higher than the operating pressures where the web is initially fed into the conveyor belt. Though six groups 81 of orifices are shown in FIG. 4(*a*), this number is not critical, but will depend on the weight of the web, the speed, the pressures used, the number of rows of holes in each group, etc. After passing between the fluid ejecting manifold and the suction manifolds, the now formed nonwoven fabric is passed over an additional suction slot 86 to remove excess water. The distance from the lower surfaces of the groups 81 of orifices to the upper surface of fibrous web 83 typically ranges from about 0.5 inch to about 2.0 inches; a range of about 0.75 inch to about 1.0 inch is preferred. It will be apparent that the web cannot be spaced so closely to the manifold that the web contacts the manifold. On the other hand, if the distance between the lower surfaces of the orifices and the upper surface of the web is too great, the fluid streams will lose energy and the process will be less efficient.

A preferred apparatus for producing nonwoven fabrics using support members of the present invention is schematically depicted in FIG. 4(*b*). In this apparatus, the topographical support member is a rotatable drum sleeve 91. The drum under the drum sleeve 91 rotates in a counterclockwise direction. The outer surface of the drum sleeve 91 comprises the desired topographical support configuration. Disposed about a portion of the periphery of the drum is a manifold 89 connecting a plurality of orifice strips 92 for applying water or other fluid to a fibrous web 93 placed on the outside surface of the curved plates. Each orifice strip may comprise one or more rows of very fine diameter holes or apertures of the type mentioned earlier herein. Typically, the apertures are approximately 0.005 inches to 0.01 inches in nominal diameter, for example. Other sizes, shapes and orientations may obviously be utilized, if suitable for the purpose. Also, there may be, for example, as many as 50 or 60 holes per inch or more if desired. Water or other fluid is directed through the rows of orifices. In general, and as explained above, the pressure in each orifice group is typically increased from the first group under which the fibrous web passes to the last group. The pressure is controlled by appropriate control valves 97 and is monitored by pressure gauges 98. The drum is connected to a sump 94 on which a vacuum may be pulled to aid in removing water and to keep the area from flooding. In operation, the fibrous web 93 is placed on the upper surface of the topographical support member before the water ejecting manifold 89 as seen in FIG. 4(*b*). The fibrous web passes underneath the orifice strips and is formed into a nonwoven product. The formed nonwoven is then passed over a section 95 of the apparatus 95 where there are no orifice strips, but vacuum is continued to be applied. The fabric after being de-watered is removed from the drum and passed around a series of dry cans 96 to dry the fabric.

Turning now to the structure of the support members, fabrics, belts, or sleeves, the support members may have a pattern of through voids. The through voids may include, among other things, geometrical characteristics that provide enhanced topography and bulk to the nonwoven products or web when produced, for example, on a support member, belt, or sleeve. Other advantages of the instant support members include easier web release, improved contamination resistance, and reduced fiber picking. Yet another advantage is that it avoids the constraints of and need for a conventional weaving loom since the through voids can be placed in any desired location or pattern. In addition, fabrics, belts or sleeves constructed in accordance with the instant invention will result in deeper pockets resulting in a nonwoven product with higher bulk absorbency and lower density.

It will be appreciated that the term "through void" is synonymous to the term "through hole" and represents any opening that passes entirely through a support member such as a belt or sleeve. A support member as referred to herein includes, but is not limited to, industrial fabrics such as belts or conveyors, and sleeves or cylindrical belts specifically used in nonwoven production, such as for example, in airlaid, melt blowing, spunbonding, or hydroentangling processes. As mentioned earlier, while the term fabric and fabric structure is used to describe the preferred embodiments, fabric, belt, conveyor, sleeve, support member, and fabric structure are used interchangeably to describe the structures of the present invention.

Figure 1A:
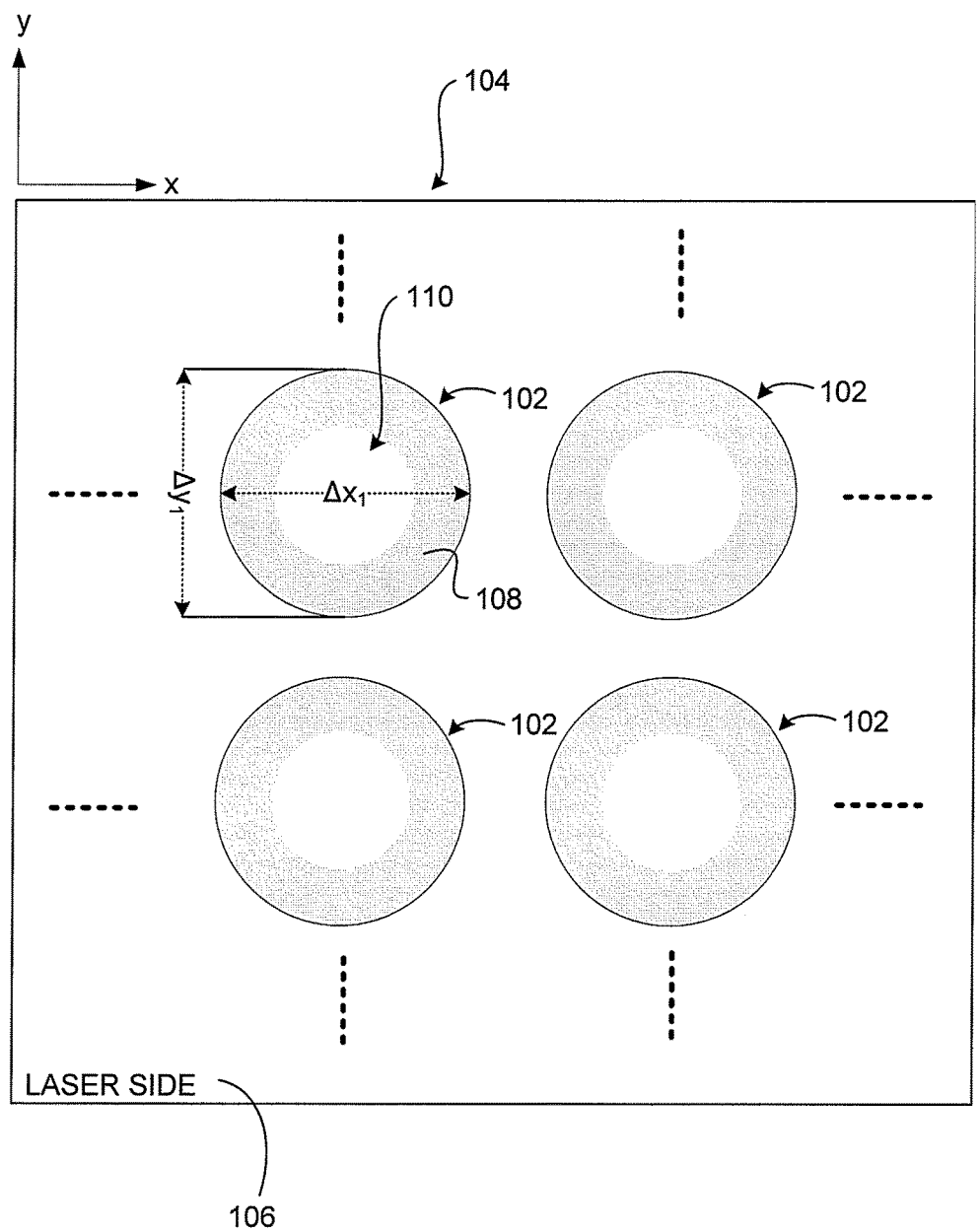
FIGS. 1A and 1B are an example of an industrial fabric, belt or sleeve having through voids according to one aspect of the instant invention.
Figure 1B:
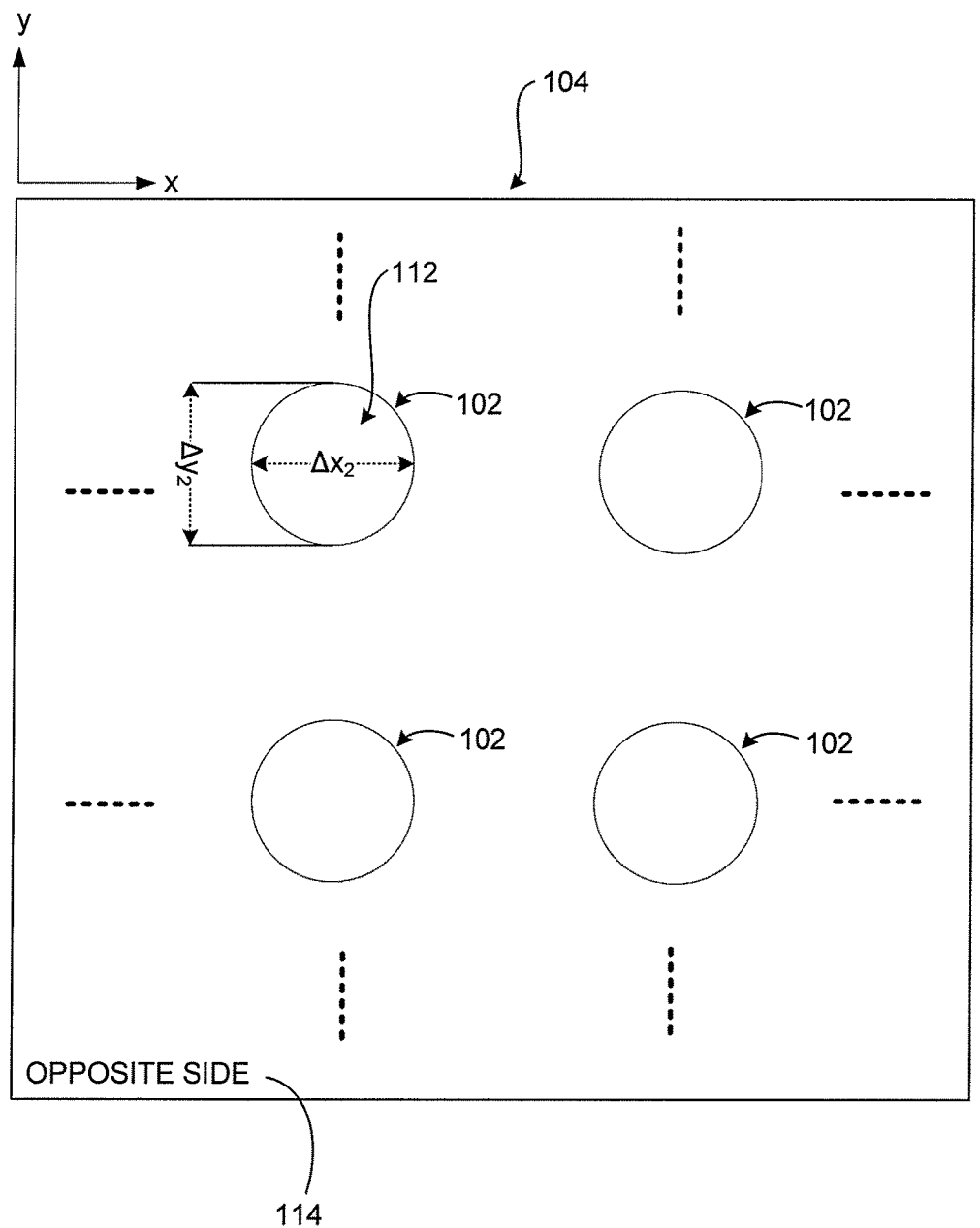

FIGS. 1A and 1B illustrate a plan view of a plurality of through voids 102 that are produced in a portion of a fabric, belt or sleeve 104 in accordance with one exemplary embodiment. According to one aspect, the through voids serve as drainage holes that are used in spunlace or hydroentangling process for the production of nonwovens. FIG. 1A shows the plurality of through voids 102 from the perspective of a top surface 106 (i.e., laser side) that faces a laser source (not shown), whereby the laser source is operable to create the through voids or through holes in the fabric 104. Each through void 102 may have a conical shape, where the inner surface 108 of each through void 102 tapers inwardly from the opening 110 on the top surface 106 through to the opening 112 (FIG. 1B) on the bottom surface 114 (FIG. 1B) of the fabric 104. The diameter along the x-coordinate direction for opening 110 is depicted as $\Delta x_1$ while the diameter along the y-coordinate direction for opening 110 is depicted as $\Delta y_1$. Referring to FIG. 1B, similarly, the diameter along the x-coordinate direction for opening 112 is depicted as $\Delta x_2$ while the diameter along the y-coordinate direction for opening 112 is depicted as $\Delta y_2$. As is apparent from FIGS. 1A and 1B, the diameter $\Delta x_1$ along the x-direction for the opening 110 on the top side 106 of fabric 104 is larger than the diameter $\Delta x_2$ along the x-direction for the opening 112 on the bottom side 114 of fabric 104. Also, the diameter $\Delta y_1$ along the y-direction for the opening 110 on the top side 106 of fabric 104 is larger than the diameter $\Delta y_2$ along the y-direction for the opening 112 on the bottom side 114 of fabric 104.

Figure 2A:
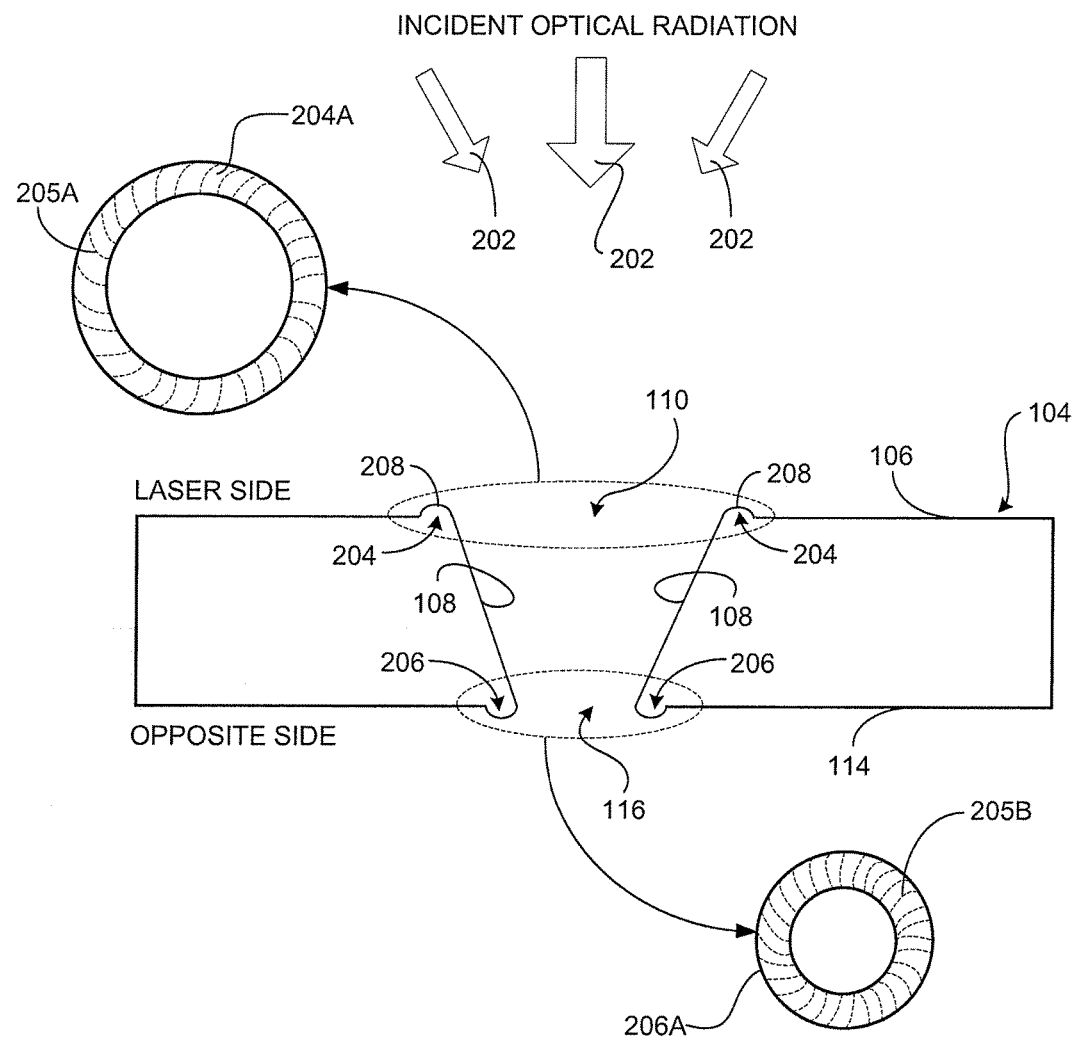
FIG. 2A is an example of a cross-section of a fabric, belt or sleeve having through voids according to one aspect of the instant invention.

FIG. 2A illustrates a cross-sectional view of one of the through voids 102 depicted in FIGS. 1A and 1B. As previously described, each through void 102 may have a conical shape, where the inner surface 108 of each through void 102 tapers inwardly from the opening 110 on the top surface 106 through to the opening 112 on the bottom surface 114 of the fabric 104. The conical shape of each through void 102 may be created as a result of incident optical radiation 202 generated from an optical source such as a $CO_2$ or other laser device. By applying laser radiation 202 of appropriate characteristics (e.g., output power, focal length, pulse width, etc.) to, for example, a nonwoven fabric, a through void 102 may be created as a result of the laser radiation perforating the surfaces 106, 114 of the fabric 104. The creation of through voids using laser devices shall be described in later paragraphs with the aid of experimental data.

As illustrated in FIG. 2A, according to one aspect, the laser radiation 202 creates, upon impact, a first raised edge or ridge 204 on the top surface 106 and a second raised edge or ridge 206 on the bottom surface 114 of the fabric 104. These raised edges 204, 206 may also be referred to as a raised rim or lip. A plan view from the top for raised edge 204 is depicted by 204A. Similarly, a plan view from the bottom for raised edge 206 is depicted by 206A. In both depicted views 204A and 206A, dotted lines 205A and 205B are graphical representations illustrative of a raised rim or lip. Accordingly, dotted lines 205A and 205B are not intended to represent striations. The height of each raised edge 204, 206 may be in the range of 5-10 μm. The height is calculated as the level difference between surface of the fabric and the top portion of the raised edge. For example, the height of raised edge 204 is measured as the level difference between surface 106 and top portion 208 of raised edge 204. Raised edges such as 204 and 206 provide, among other advantages, local mechanical reinforcement for each through void or through hole, which in turn contributes to the global resistance of a given perforated fabric (e.g., a creping fabric). Also, deeper voids result in deeper pockets in the nonwoven produced, and also result in, for example, more bulk and lower density. It is to be noted that $\Delta x_1/\Delta x_2$ may be 1.1 or higher and $\Delta y_1/\Delta y_2$ may be 1.1 or higher in all cases. Alternatively, in some or all cases, $\Delta x_1/\Delta x_2$ may be equal to 1 and $\Delta y_1/\Delta y_2$ may be equal to 1, thereby forming through voids of a cylindrical shape.

While the creation of through voids having raised edges in a fabric may be accomplished using a laser device, it is envisaged that other devices capable of creating such effects may also be employed. Mechanical punching or embossing then punching may be used. For example, the nonwoven fabric may be embossed with a pattern of protrusions and corresponding depressions in the surface in the required pattern. Then each protrusion for example may be mechanically punched or laser drilled.

Figure 3A:
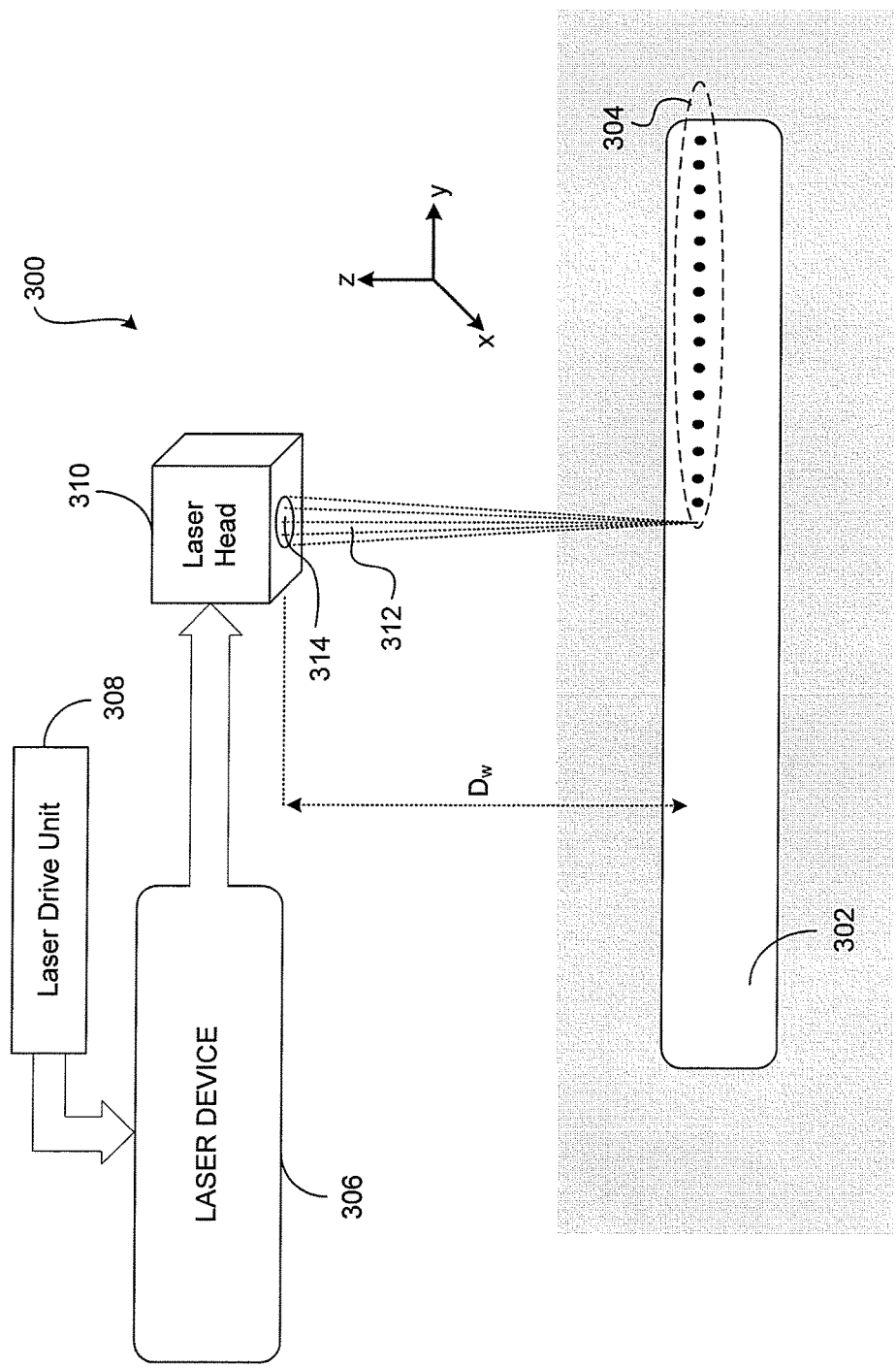
FIG. 3A is a system block diagram for generating a fabric, belt or sleeve having through voids according to one aspect of the instant invention.

FIG. 3A illustrates an exemplary embodiment of a system 300 for generating through voids 304 in a fabric 302. System 300 may include a laser device 306, a laser drive unit 308, a laser head 310, and mechanical fixtures 316 upon which the fabric 302 is placed.

The laser drive unit 308 controls the various conditions that vary the output generated by the laser. For example, the drive unit 308 may allow for the adjustment of output power from the laser and the provision of various modulation characteristics. For instance, the laser may be pulsed over a fixed or continuous time period, whereby the pulse width may be adjusted over a particular range.

The laser head 310 delivers incident optical radiation 312 to the fabric 302 via nozzle 314 for creating the through voids 304. The incident optical radiation 312 may be subjected to various beam shaping components prior to being output from the nozzle 314. For example, different optical lens arrangements may be used to achieve a desired working distance (i.e., $D_w$) between the nozzle 314 of the laser head 310 and the top surface of the fabric, belt or sleeve 302. Also, optical splitters, isolators, polarizers, slits, and/or other components may be used to vary different attributes associated with the incident optical radiation 312 output from the laser head 310. For example, control of spot-size and spot-shape may be one desired attribute. In effect, the incident optical radiation is drilling (or cutting) through holes or through voids in the fabric 302.

The fabric, belt or sleeve 302 may be mounted or placed on a suitable apparatus (e.g., see FIG. 3B) that has different motorized components, rails, rollers, etc., in order to facilitate the movement of the fabric 302 and/or the laser head 310 in a specific x-y coordinate direction. By controlling the movement of the fabric 302 along the x-y coordinate direction, a topography of through voids may be created on the fabric according to different desired patterns. In addition to the movement in the x-y direction, working distance $D_w$ may be varied by mounting the laser head 310 on a motorized platform that provides movement along a z-coordinate direction. It may be possible to design a system whereby the laser head moves in three-dimensions while the fabric remains fixed. Alternatively, the laser head may traverse across the fabric in a widthwise "x" or CD (cross machine direction) manner while the fabric moves in the machine direction (MD) or "y" axis. It may also be possible to setup a system where the fabric is moved in three-dimensions relative to a mechanically fixed laser head.

Figure 3B:
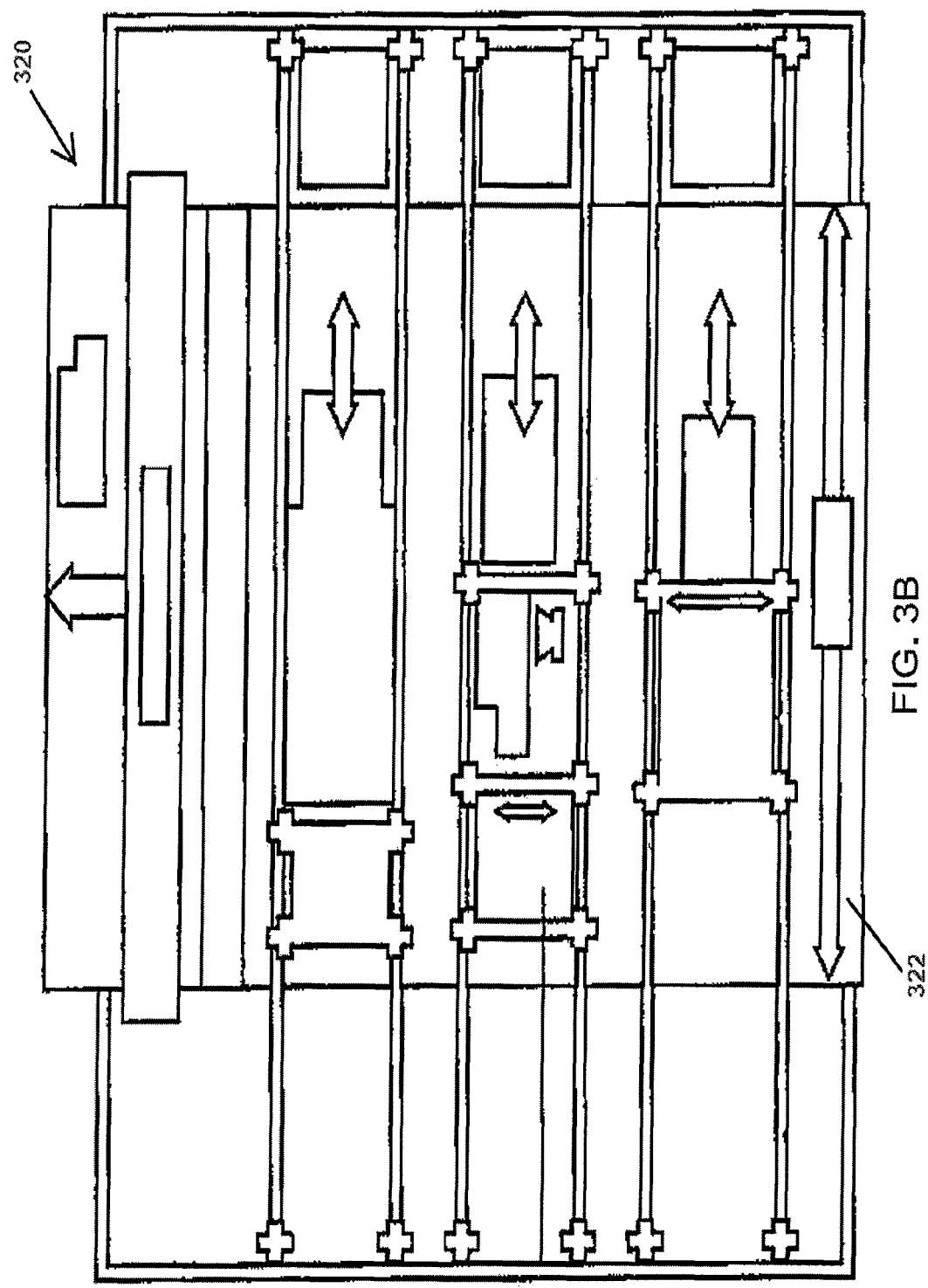
FIG. 3B illustrates an apparatus used in the generation of through voids in a fabric, belt or sleeve according to one aspect of the invention.

FIG. 3B illustrates an exemplary embodiment of an apparatus 320 used in the generation of through voids in a fabric, belt or sleeve, according to one aspect of the invention. Fabric 322 shown in FIG. 3B should be understood to be a relatively short portion of the entire length of the fabric 322. Where the fabric 322 is endless, it would most practically be mounted about a pair of rolls, not illustrated in the figure but most familiar to those of ordinary skill in the art. In such a situation, apparatus 320 would be disposed on one of the two runs, most conveniently the top run, of the fabric 322 between the two rolls. Whether endless or not, however, fabric 322 is preferably placed under an appropriate degree of tension during the process. Moreover, to prevent sagging, fabric 322 may be supported from below by a horizontal support member as it moves through apparatus 320.

Referring now more specifically to FIG. 3B, where fabric 322 is indicated as moving in an upward direction through the apparatus 320 as the method of the present invention is being practiced, apparatus 320 comprises a sequence of several stations through which fabric 322 may pass incrementally as the fabric is being manufactured therefrom.

Figure 5:
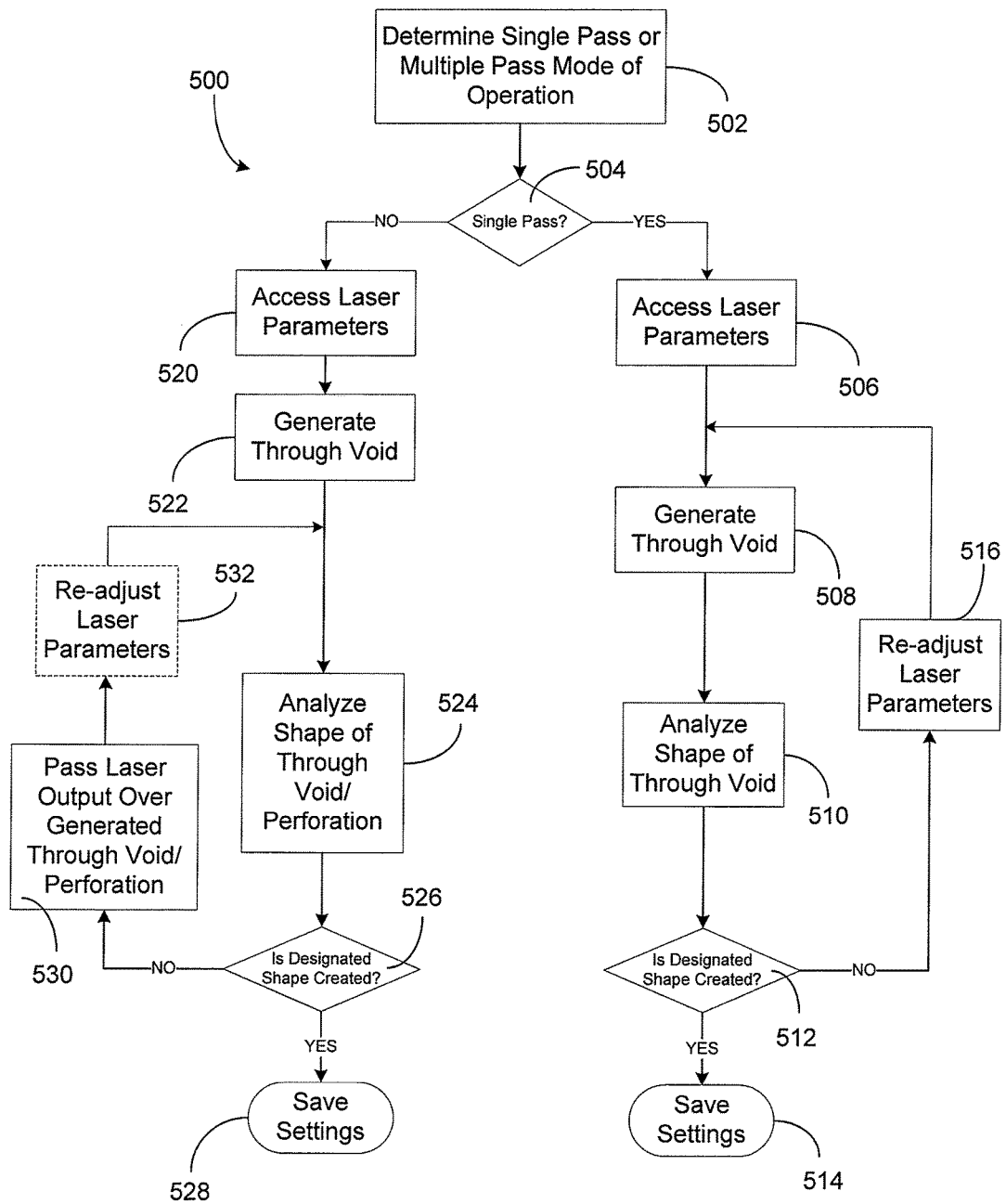
FIG. 5 is flow diagram describing the process of generating through holes in a fabric, belt or sleeve according to one aspect of the instant invention.

The fabric, belt or sleeve described in the above-embodiment is one example of a fabric that would be drilled according to the systems and methods described herein. The desirable characteristics of the described through voids created in the fabric would enhance one or more characteristics associated with a nonwoven product manufactured thereon. Fabrics constructed according to the instant invention improve performance on the nonwoven production machine because the through voids in the fabric preferably are cone shaped with wide openings on the web or sheet side and small openings on the machine side, which in turn allows the fabric to operate at higher draw levels or at lower basis weights. FIG. 5 illustrates a flow diagram 500 describing the process of generating through holes in a fabric according to one exemplary embodiment. At step 502, it is determined whether a laser device will operate in single pass mode or multi-pass mode. In single pass mode, the laser creates a through void in a single pass as it moves over the fabric. In multi-pass mode, the laser passes over the fabric for two or more times and applies optical radiation to the same locations on the fabric until creation of the desired through voids is complete.

If at step 504 it is determined that the single pass mode is selected, a set of laser parameters are accessed (step 506). These laser parameters may include the various settings that are applied to a laser drive unit such as unit 308 (FIG. 3). At step 508, based on the accessed laser parameters, optical radiation output from the laser perforates the fabric in order to generate a desired shape of the through void. At step 510, once the shape/geometry of a generated through void is analyzed (e.g., visual inspection, image acquisition/processing, etc.), it is determined whether the through void meets the desired shape criteria (step 512). If the through void meets the desired shape criteria (step 512), the accessed laser settings are saved (step 514) so that they may be re-used in the process of drilling identical or similar fabrics. If on the other hand it is determined that the through void fails to meet the desired shape criteria (512), the laser parameters used to drive the laser are re-adjusted (step 516) in an attempt to produce a through void having the desired shape criteria. Process steps 512, 516, 508, and 510 continue to be executed until the shape criteria of the through holes is satisfied. Once the shape of a generated through hole meets the required shape criteria, the entire fabric may be drilled.

If at step 504 it is determined that the multi-pass mode is selected, a set of laser parameters are accessed (step 520). These laser parameters may include the various settings that are applied to a laser drive unit such as unit 308 (FIG. 3). At step 522, based on the accessed laser parameters, optical radiation output from the laser perforates the fabric in order to generate a desired shape of through void. At step 524, once the shape/geometry of a generated through void or perforation is analyzed (e.g., visual inspection, image processing, etc.), it is determined whether the perforation of the fabric has generated a through void and whether the generated through void meets the desired shape criteria (step 526). If a through void is generated and it meets the desired shape criteria (step 526), the accessed laser settings are saved (step 528) so that they may be re-used in the process of drilling identical or similar fabrics. If on the other hand it is determined that either a through void has not been generated (e.g., a perforation of fabric surface) or a generated through void fails to meet the desired shape criteria (526), the laser is passed over the through void for a subsequent time and applies optical radiation to the through hole (step 530). Process steps 526, 530, 532 (optional step), and 524 continue to be executed until both the through void is created and the required shape criteria of the through void is satisfied. Once the shape of a generated through void meets the required shape criteria, the entire fabric may be drilled. At optional step 532, the laser parameters used to drive the laser may also be re-adjusted in order to aid both the generation of the through void and/or to establish a through void having the desired shape criteria. It will be appreciated, however, that the number of passes for generating a through void vary according to many factors such as, but not limited to, the fabric material, fabric thickness, laser device type, laser operating or drive parameters, etc.

Figure 6:
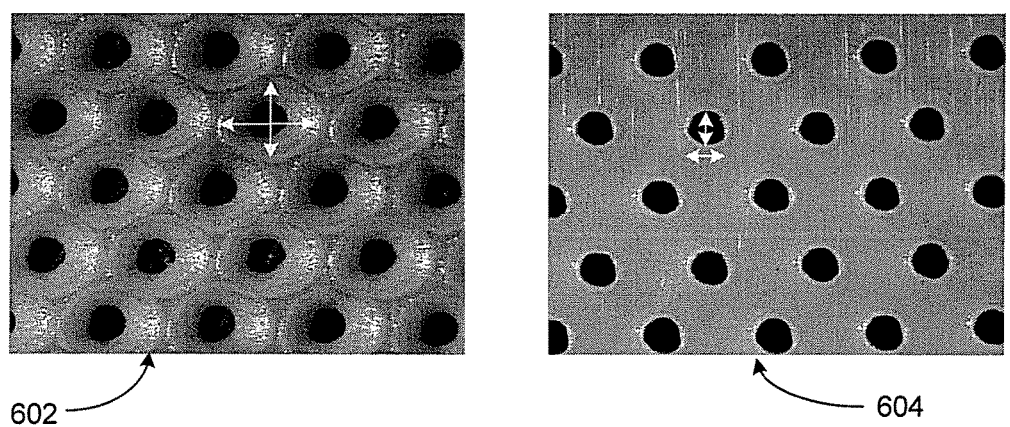
FIG. 6 illustrates images of a fabric, belt or sleeve drilled in accordance with one aspect of the instant invention.

FIG. 6 illustrates images of a fabric drilled in accordance with one or more aspects of the instant invention. Image 602 illustrates drilled through voids in a fabric, as observed from the top surface (i.e., laser side) of the fabric. Image 604 illustrates the drilled through voids, as observed from the bottom surface (i.e., opposite side) of the fabric. The drilling criteria was to achieve round shaped through voids having a higher open area on the laser side or top surface. Images 602 and 604 show the higher openings (FIG. 602) on the laser side or top surface relative to the openings on the bottom surface (FIG. 604). The through voids may be drilled using a $CO_2$ laser that may be programmed or operated to generate optical pulses of a predefined pulse width over a predefined time period. Various other parameters associated with the through void drilling process may include, for example but not limited to, setting the output power (Watts) generated by the laser, the drilling speed, the incremental movement in both x and y directions, the working distance (i.e., distance from laser head nozzle to surface of fabric), the density (holes/inch$^2$) requirements for given fabric, and the number of passes for subjecting the fabric to optical radiation.

Figure 7:
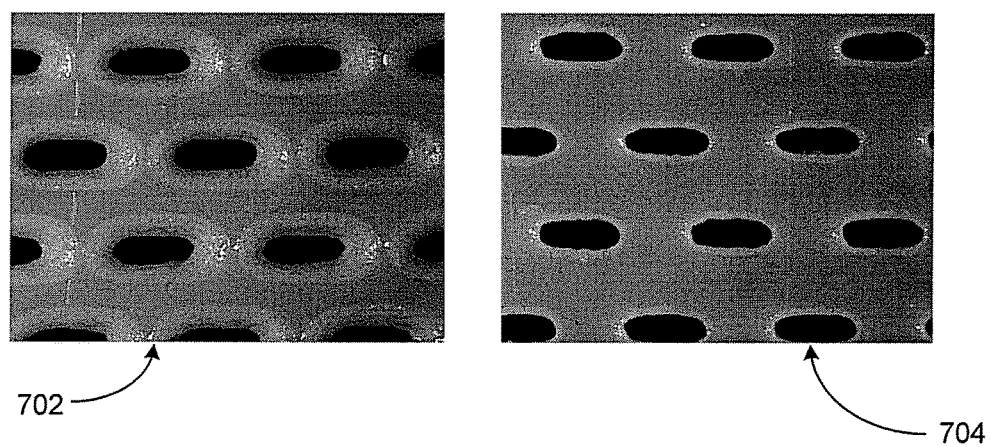
FIG. 7 illustrates images of a fabric, belt or sleeve drilled in accordance with another aspect of the instant invention.

FIG. 7 illustrates images of a fabric drilled in accordance with one or more aspects of the instant invention. Image 702 illustrates drilled through voids in a fabric, as observed from the top surface (i.e., laser side) of the fabric. Image 704 illustrates the drilled through voids, as observed from the bottom surface (i.e., opposite side) of the fabric. The drilling criteria was to achieve through voids having a higher open area on the laser side or top surface relative to the opposite side or bottom surface of the fabric. Images 702 and 704 show the higher openings (FIG. 702) on the laser side or top surface relative to the openings on the bottom surface (FIG. 704). These through voids may also be drilled using a $CO_2$ laser that may be programmed or operated to generate optical pulses of a predefined pulse width over a predefined time period. Various other parameters associated with the through void drilling process may include, but are not limited to, setting the output power (Watts) of the laser, the drilling speed, the incremental movement in both x and y directions, the working distance (i.e., distance from laser head nozzle to surface of fabric), the density (holes/inch$^2$) requirements for a given fabric, and the number of passes for subjecting the fabric to optical radiation. As illustrated in FIG. 7, the shape of the through holes are substantially oval shaped in comparison to the through voids shown in FIG. 6. Different factors and/or parameters (e.g., drilling speed) may contribute to the differences in through void shape and through void open areas (%) corresponding to both the laser side and opposite side of the fabric.

FIGS. 8A-G illustrate images of a laminate fabric drilled in accordance with one aspect of the instant invention. The laminate fabric according to this embodiment may include two or more layers attached using a suitable laminating technique. A $CO_2$ laser, for example, may be operated in a tone burst mode, delivering an output power of around 600 W, for example. Since the fabric being drilled was a laminate, the through voids were generated after multiple passes of the incident optical radiation.

Figure 8A:
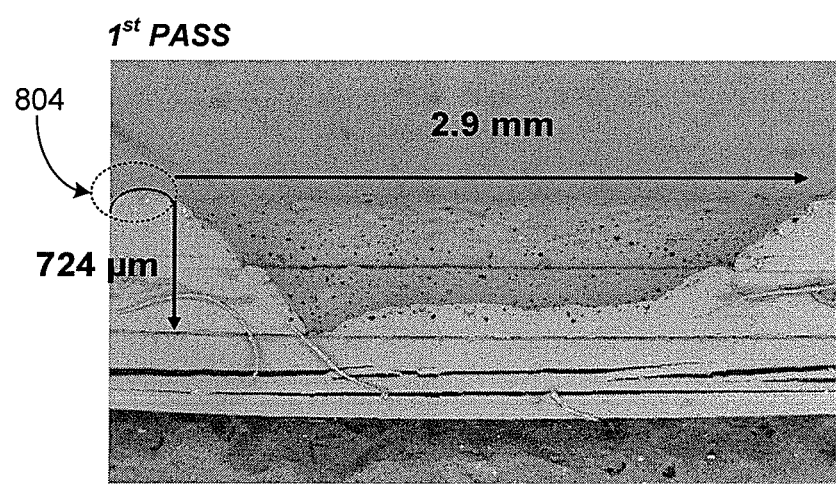
FIGS. 8A-G illustrate images of a laminate fabric, belt or sleeve drilled in accordance with an aspect of the instant invention.
Figure 8B:
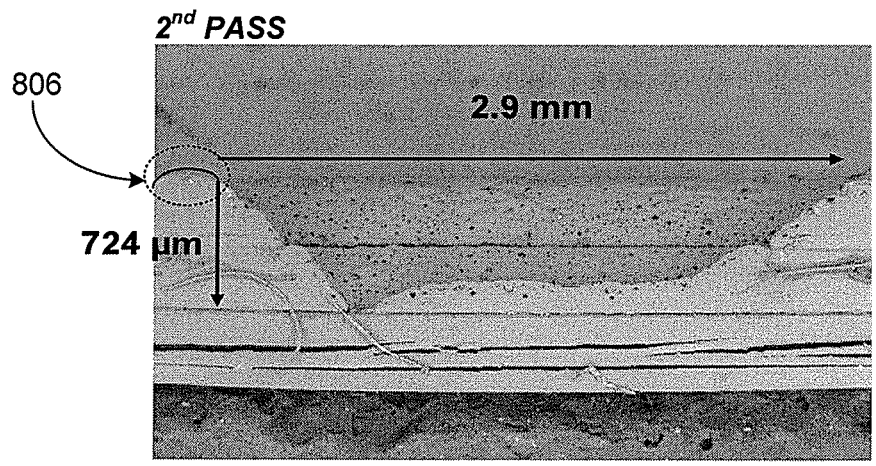
Figure 8C:
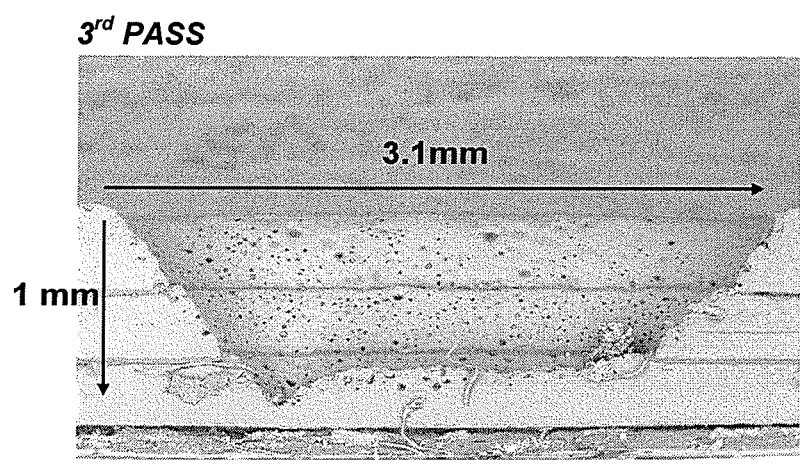
Figure 8D:
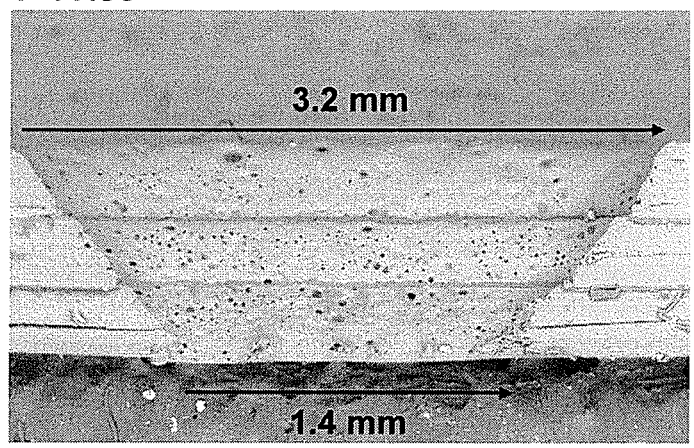
Figure 8E:
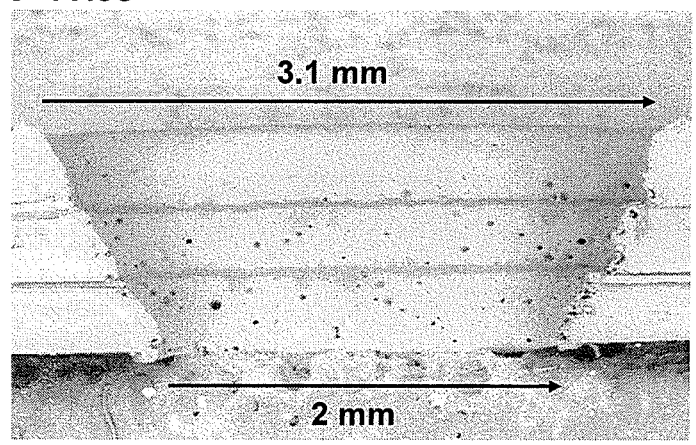
Figure 8F:
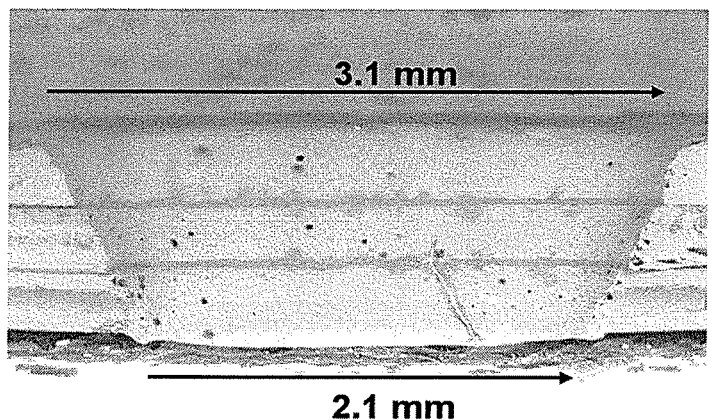
Figure 8G:
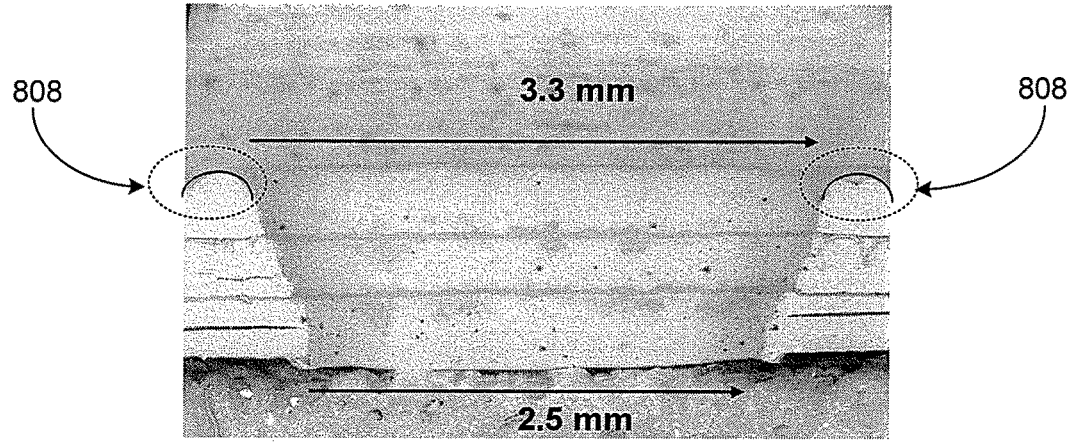

FIGS. 8A-G are microscope images that show the depth of penetration of the incident optical radiation with each pass, from the 1$^{st}$ pass to the 7$^{th}$ pass. These images also show the raised edges created during the drilling process. Examples of these raised edges (i.e., top surface) are depicted at 804 (FIG. 8A), 806 (FIG. 8B), and 808 (FIG. 8G). With each pass, the images in FIGS. 8A-G illustrate some increases in the openings on both the top surface and bottom surface of the through void. For example, the image associated with FIG. 8D shows a top surface opening having a diameter of about 3.2 mm on the top surface and a diameter of about 1.4 mm on the bottom surface of the through void after the $4^{th}$ pass. After the $7^{th}$ pass however, as illustrated in FIG. 8G, the top surface opening has increased to a diameter of about 3.3 mm on the top surface and a diameter of about 2.5 mm on the bottom surface of the through void. These depicted results show that 5 passes were needed to generate a through void. It will be appreciated, however, that the number of passes for generating a through void vary according to many factors such as, but not limited to, the laminate material, laminate thickness, laser device type, laser operating or drive parameters, etc.

Figure 9:
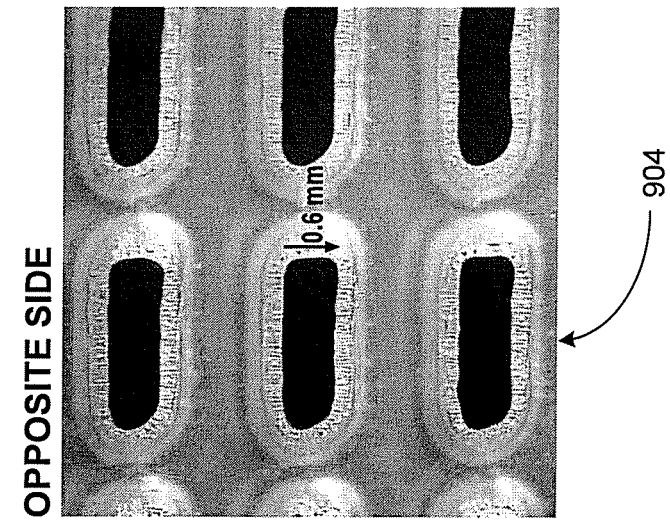
FIG. 9 illustrates images of both top and bottom surfaces of the drilled through voids corresponding to FIG. 8G.
Figure 9:
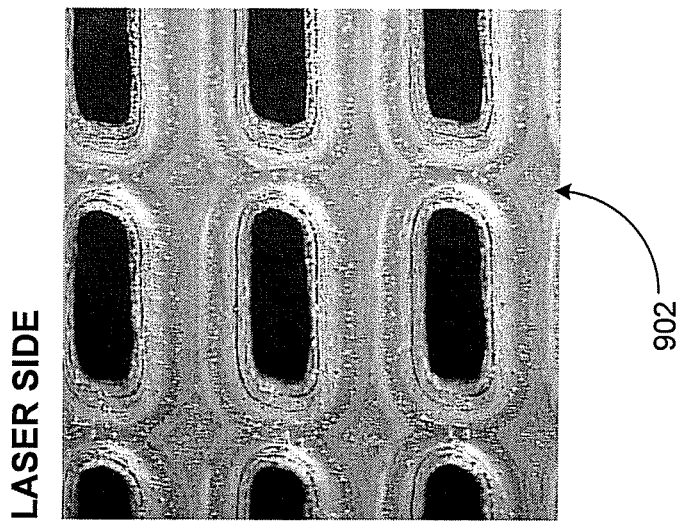

FIG. 9 illustrates the images of both the top surface 902 and bottom surface 904 of the drilled through voids corresponding to FIG. 8G (i.e., after $7^{th}$ pass). As shown in FIG. 9, after the $7^{th}$ pass the shape of the top and bottom openings of the through voids are substantially rectangular shaped.

Figure 10:
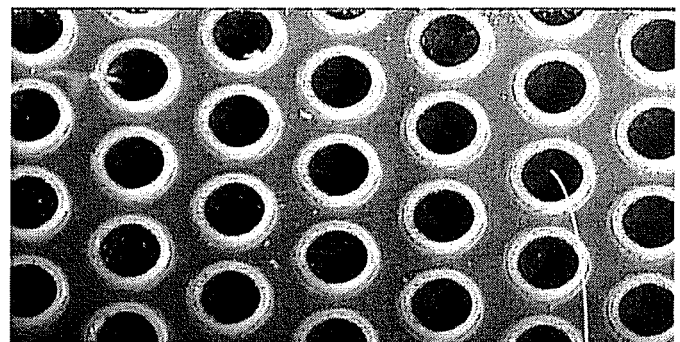
FIG. 10 depicts several generated through voids according to yet another aspect of the instant invention.
Figure 10:
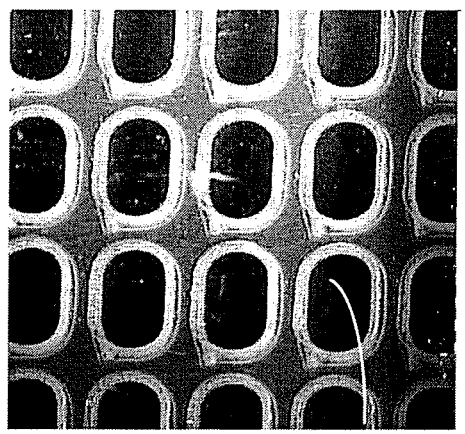

FIG. 10 depicts several void patterns from experimental trials for generating through voids according to yet another aspect of the instant invention. In some instances, through voids of an increased size may be desired. Laser spot size, for example, may be a limiting factor. To overcome this restriction and generate larger through voids, the laser device is effectively used as a cutter rather than a drill. To create this cutting action, the laser head may be wobbled (i.e., Wobulation or Vobulation) according to different frequency (e.g., Wobulation or Vobulation frequency) and strength criteria (e.g., Wobulation or Vobulation index) in order to establish larger through voids.

For example, images 1010 and 1012 depicted in FIG. 10 correspond to through voids that are generated based on different operating parameters such as, but not limited to, drilling speed, wobulation frequency, wobulation index, laser output power, etc. Accordingly, the shape of the surface openings 1014 for the through voids corresponding to image 1010 is substantially round, while the shape of the surface openings 1016 for the through voids associated with image 1012 is substantially rectangular. One factor, among others, affecting the shape of surface openings may be the scanning speed (i.e., mm/s) of the laser as the incident radiation moves from one position to the next in order to generate a subsequent through void in the fabric.

Figure 2B:
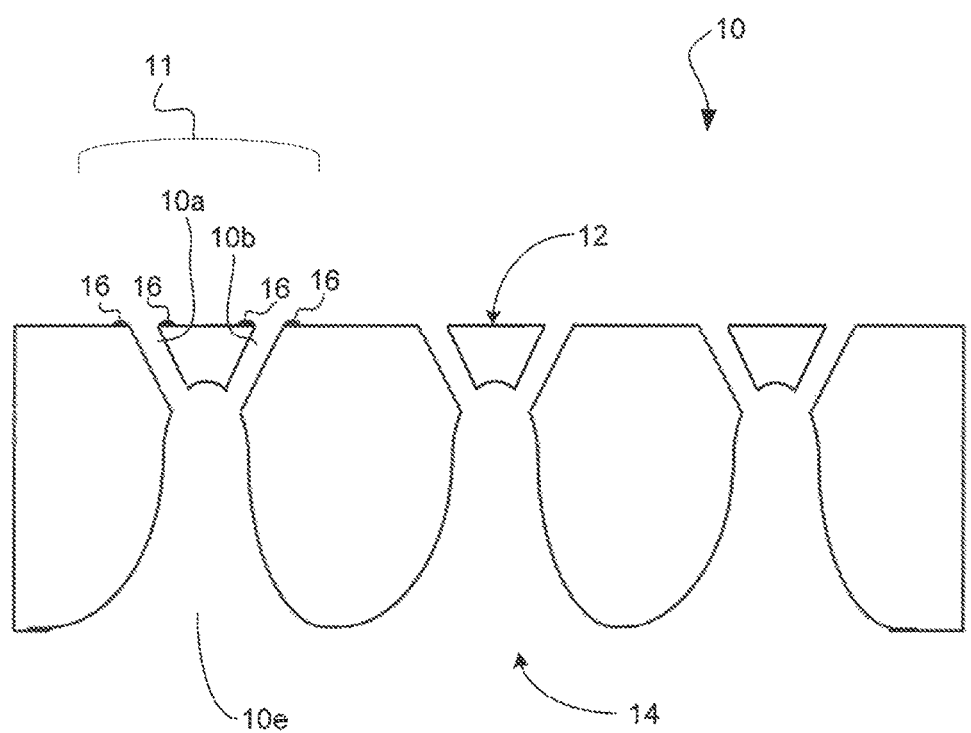
FIG. 2B is an example of a cross-section of a fabric, belt or sleeve having a branched void structure according to one aspect of the instant invention.

In another embodiment, a fabric structure that may or may not have a base support substrate comprises a sheet contact surface having a series of land areas and depressions, and a branched void structure adapted to impart texture to a tissue, towel, or nonwoven. FIG. 2B shows the cross-section of the surface of a fabric structure 10 with a branched void or opening 11 which comprises a plurality of small holes 10a and 10b on the sheet side 12 that are inclined such that they merge into a larger void 10e at an opposing side 14 of the surface. As illustrated, the branched opening 11 may also be formed to include raised edges or rims 16 adjacent the circumference of holes 10a and 10b. Although not shown in FIG. 2B, raised edges or rims may also be formed adjacent the circumference of the larger void 10e on the opposing side 14 of the fabric structure. Although holes 10a and 10b are shown as merging into void 10e, a branched void structure having three or more holes merging into a larger void may be contemplated, whereby raised rims may be formed adjacent either or both the smaller sheet side holes and the larger opposing side void. Further, the raised rims may cover the fabric either partially or fully.

Such a structure allows for a high number of small holes in a fabric structure while also allowing for low long term elongation in the machine direction MD while allowing for high bending stiffness in the cross machine direction CD. Such a structure can also be adapted such that, for example, it allows for holes in the fabric structure that are smaller in diameter than the substrate thickness without resulting in, for example, plugged holes due to contamination.

A fabric structure having the described branched structure surface is contemplated for nonwoven applications. For example, a coarse structure on a top surface and smaller holes on an opposing bottom or machine side surface could, for instance, capture, shape, and/or orient fibers disposed on the fabric structure in a desired pattern and create a textured nonwoven. As previously described, the described voids can be straight (cylindrical) or conical. For instance, conical holes of different patterns could be designed such that they are larger and well distributed over one side such as a web or sheet side surface, whereas the voids on the opposing machine side surface could be substantially aligned along the MD, thereby providing, for example, increased drainage. The branched voids can be created by any number of perforation methods or combination thereof, including laser drilling, mechanical punching, and embossing (e.g. thermal or ultrasonic). For example, the voids could be created by combining laser drilling with embossing.

Bear in mind as aforementioned normally nonwoven making belts do not impart structure to the nonwoven made thereon. "Structure" pertains to variations in the basis weight and/or the density of the nonwoven which are greater than occur in ordinary nonwoven making process and due to ordinary variations. "Structure" may also, however, refer to a texture or a pattern in the nonwoven. Such "structured" nonwovens are usually soft and bulky with high absorbency. Such belts comprise a surface patterning framework and may have a reinforcing structure. Structured nonwovens can be softer, more absorbent, and be of a lower basis weight than unstructured nonwovens.

An industrial fabric, generally, has two sides: a sheet or web contacting side and a machine or roll side. The former is so-called because it is the side of the fabric that faces the newly formed nonwoven web. The latter is so-called because it is the side of the fabric that passes over and is in contact with the rolls on the machine.

Figure 11:
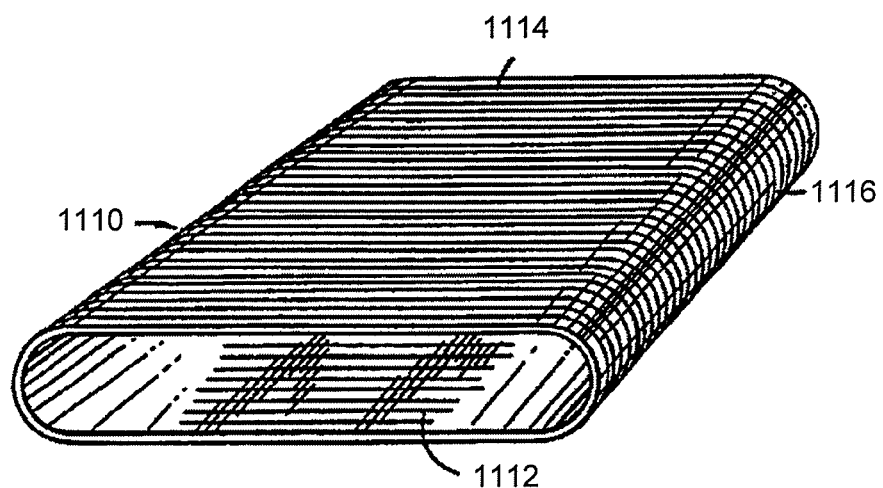
FIG. 11 is a perspective view of a fabric, belt or sleeve according to one aspect of the present invention.

FIG. 11 is a perspective view of a belt or sleeve 1110 formed according to one exemplary embodiment of the invention. According to this embodiment, the belt or sleeve 1110 has an inner surface 1112 and an outer surface 1214, and is formed by spirally winding a strip of polymeric material 1116 produced using one of the several methods and systems discussed above. The belt may be produced using the method described in commonly owned U.S. Pat. No. 5,360,656 to Rexfelt et al., the entire contents of which are incorporated herein by reference. Material strip 1116 may be spirally wound in a plurality of abutting and mutually adjoined turns, substantially longitudinal direction around the length of the belt 1110 by virtue of the helical fashion in which the belt 1110 is constructed.

Figure 12:
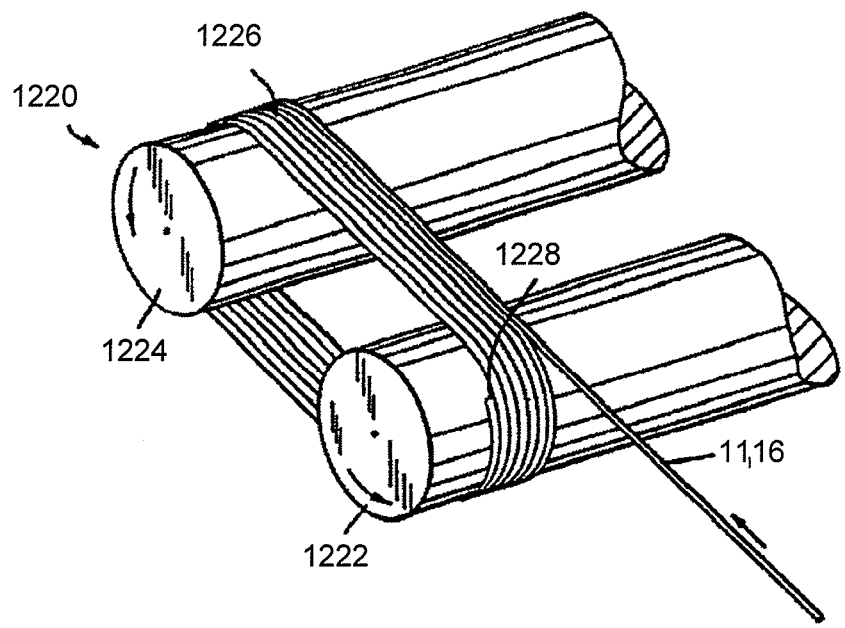
FIG. 12 illustrates a method by which the fabric of the present invention may be constructed.

An exemplary method by which the belt 1110 may be manufactured is illustrated in FIG. 12. Apparatus 1220 includes a first process roll 1222 and a second process roll 1224, each of which is rotatable around its longitudinal axis. The first process roll 1222 and the second process roll 1224 are parallel to one another, and are separated by a distance which determines the overall length of the belt 1110 to be manufactured thereon, as measured longitudinally therearound. At the side of the first process roll 1222, there is provided a supply reel (not shown in the figures) rotatably mounted about an axis and displaceable parallel to process rolls 1222 and 1224. The rolls 1222 and 1224 may be set so that the length of the fabric wound thereon is approximately the desired length of the final fabric. The supply reel accommodates a reeled supply of the material strip 1116 having a width of 10 mm or more, for example. The supply reel is initially positioned at the left-hand end of the first process roll 1222, for example, before being continuously displaced to the right or other side at a predetermined speed.

To begin the manufacture of the belt 1110, the beginning of the material strip 1116 is extended in taut condition from the first process roll 1222 toward the second process roll 1224, around the second process roll 1224, and back to the first process roll 1222 forming a first coil of a closed helix 1226. To close the first coil of the closed helix 1226, the beginning of the material strip 1116 is joined to the end of the first coil thereof at point 1228. As will be discussed below, adjacent turns of the spirally wound material strip 1116 are joined to one another by mechanical, thermal, and/or adhesive means.

Therefore, subsequent coils of closed helix 1226 are produced by rotating first process roll 1222 and second process roll 1224 in a common direction as indicated by the arrows in FIG. 12, while feeding the material strip 1116 onto the first process roll 1222. At the same time, the material strip 1116 being freshly wound onto the first process roll 1222 is continuously joined to that already on the first process roll 1222 and the second process roll 1224 by, for example, mechanical and/or adhesive or any other suitable means to produce additional coils of closed helix 1226.

This process continues until the closed helix 1226 has a desired width, as measured axially along the first process roll 1222 or the second process roll 1224. At that point, the material strip 1116 not yet wound onto the first process roll 1222 and the second process roll 1224 is cut, and the closed helix 1226 produced therefrom is preferably trimmed to make the edges of the fabric parallel and to a desired width, and then removed from the first process roll 1222 and the second process roll 1224 to provide the belt 1110 of the present invention.

One method to seam or hold together the adjacent material strips, according to one embodiment of the invention, is to ultrasonically weld adjacent strips edge to edge while simultaneously providing a sideways pressure to keep the edges in contact with each other. For example, one part of the welding device can hold one strip, preferably the strip that has already been wound into a spiral, down against a supporting roll while another part of the device pushes the other strip, preferably the strip being unwound, up against the strip being held down.

The application of ultrasonic gap welding results in a particularly strong bond. By contrast, ultrasonic welding in either a time mode or energy mode, which is also known as conventional ultrasonic welding, results in a bond that can be described as brittle. Therefore, it may be concluded that a bond formed via ultrasonic gap welding is preferred versus conventional ultrasonic welding.

Another exemplary method to hold together adjacent strips, according to one embodiment of the invention, is to apply an adhesive to the ends of adjacent strips and joining them. It is to be noted that a filler material may be used to fill gaps or portions where the strips do not contact each other.

Another method to hold together adjacent material strips, according to one embodiment of the invention, is to weld the adjacent strips using a laser welding technique. One advantage of laser welding over ultrasonic welding is that laser welding can be accomplished at speeds in the range of 100 meters per minute while ultrasonic welding has a top end speed of about 10 meters per minute. The addition of a light absorptive dye or ink absorber to the edges of the strips may also assist in concentrating the thermal effect of the laser. Absorbers could be black ink or near IR dyes that are not visible to the human eye, such as for example those utilized by "Clearweld." The abutting edges of the strip may be prepared to improve the resistance to pulling apart in use. Edges may be skived at an angle or formed in other manners such as shown in co-owned U.S. Pat. No. 6,630,223 to Hansen, the disclosure of which is incorporated herein by reference.

The present methods and systems for producing belt 1110 are quite versatile and adaptable to the production of industrial fabrics or belts of a variety of longitudinal and transverse dimensions. That is to say, the manufacturer, by practicing the present invention, need no longer produce an endless woven or flat woven and seamed fabric of appropriate length and width for a given position on a nonwoven production machine. Rather, the manufacturer need only separate the first process roll 1222 and the second process roll 1224 by the appropriate distance, to determine the approximate length of the belt 1110, and wind the material strip 1116 onto the first process roll 1222 and the second process roll 1224 until the closed helix 1226 has reached the approximate desired width.

Further, because the belt 1110 is produced by spirally winding a material strip 1116, and is not a woven fabric, the outer surface 1112 of the belt 1110 is smooth and continuous, and lacks the knuckles which prevent the surfaces of a woven fabric from being perfectly smooth. Preferably, the material strip may be a strip of thermoplastic material, such as a film or foil, for example, and may be made of any polymeric material, preferably Polyester (PET). However, other materials such as other polyesters (e.g., polyethylene naphthalate (PEN)) or polyphenylene sulphide (PPS) could also be used. Polyamides, or polyether ether ketones (PEEK) may also be used.

With respect to a laminate of two or more layers, each layer can be the same or formed of different materials. The film or foil material can be uniaxially or biaxially oriented with sufficient modulus and stability in both MD and CD to function in the intended manner. In addition, the film or foil may contain reinforcing fibers in the MD or CD, or both MD and CD, or in any random direction. The reinforcing fibers may be included through an extrusion or pultrusion process where the fibers may be extruded or pultruded along with the material forming the film or foil. Reinforcing fibers may be formed of a high-modulus material, such as for example, aramids, including but not limited to Kevlar® and Nomex®, and may provide extra strength, modulus, tear and/or crack resistance to the film or foil.

Alternatively, the material strip may be a strip of nonwoven material formed of a low melt fiber, such as polyamides, for example, which may be carded and consolidated by needle punching or other suitable means, and which may be fused by passing the material strip through a heated roll nip, for example, thereby creating a smooth surface on one or both sides of the material strip. The nonwoven material may also comprise a blend of different materials, such as for example, a combination of low melt and high melt fibers, e.g. 90% of a low melt polyamide 6 in combination with 10% PA6,6, or any other combination chosen to impart a desired characteristic. Alternatively, a portion of the nonwoven material may comprise bicomponent fibers, such as for example sheath-core type fibers, which may have the low melt material on the outside and the functional material on the inside. The material strip can also be coated, for example, using a polyurethane resin to provide additional, for example, fabric smoothness. The coating can enhance sheet release, and/or structural integrity of the material strip. The aforesaid structures may then be perforated in a manner as heretofore described.

Figure 13A:
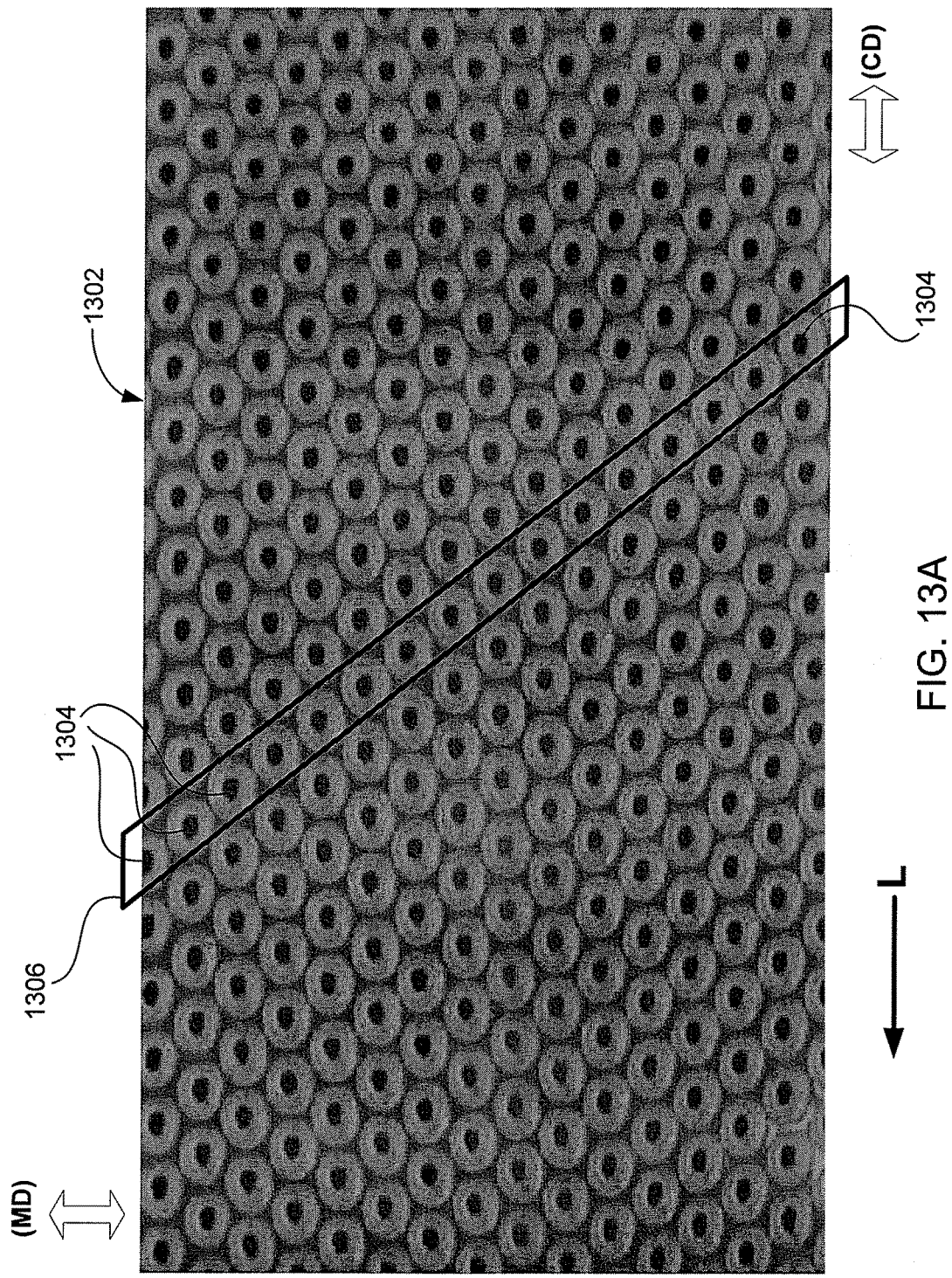
FIGS. 13A-B illustrate, respectively, a top and a bottom image of a fabric, belt or sleeve having through voids drilled in a pattern according to one aspect of the instant invention.
Figure 13B:
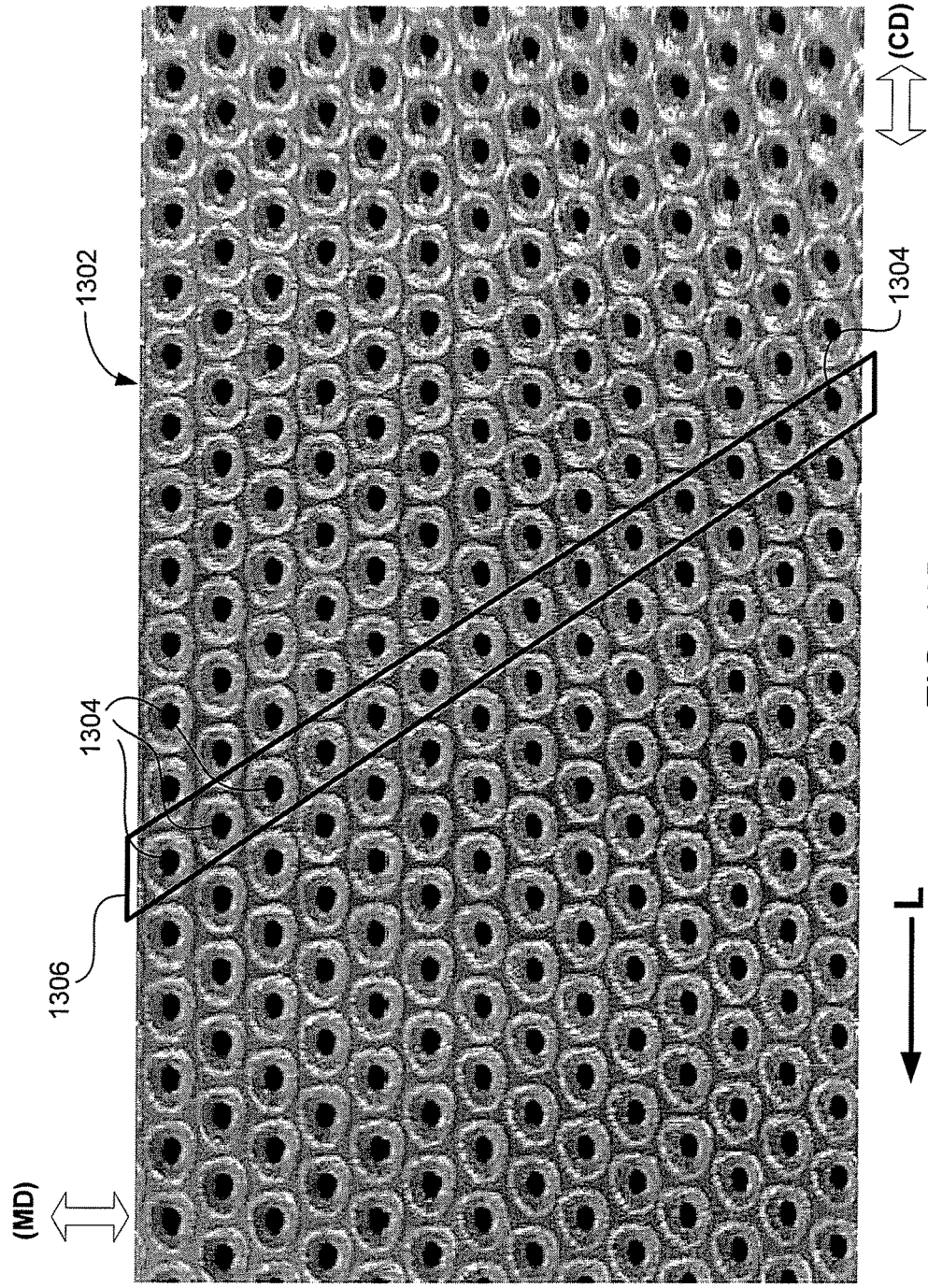

FIG. 13A illustrates a top side image of a fabric, belt or sleeve 1302 having through voids drilled in a substantially diagonal pattern, according to one alternative embodiment of the instant invention. For example, through voids 1304 are drilled according to a diagonal 1306 with respect to cross-machine direction (L) of the fabric, belt or sleeve. Likewise, FIG. 13B illustrates a bottom side image of the fabric 1302 having through voids drilled according to the substantially diagonal pattern. As illustrated, the through voids 1304 are drilled according to diagonal 1306. The illustrated exemplary images of fabric 1302 comprises a drilled fabric having a length of 15 m, for example, where the size of the top side holes are approximately 1.5 mm (CD)×1.2 mm (MD), for example, and the size of the bottom side holes are approximately 0.65 mm×0.5 mm. The distance between the holes in the CD direction is approximately 1.695 mm, and the distance between the holes in the MD is approximately 1.18 mm, for example.

Figure 14A:
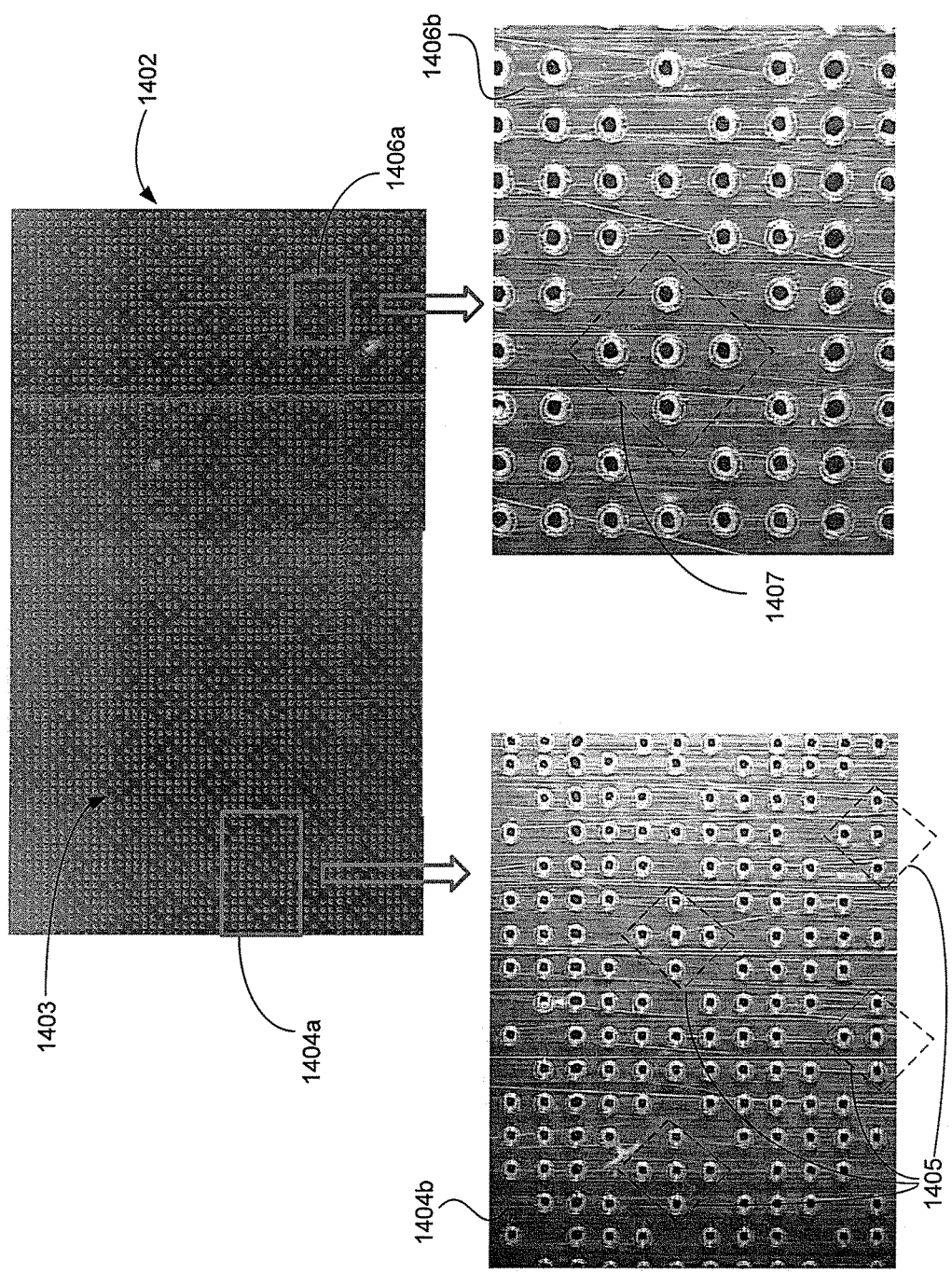
FIGS. 14A-C are images of exemplary fabrics, belts or sleeves having through voids drilled in various patterns according to another aspect of the instant invention.
Figure 14B:
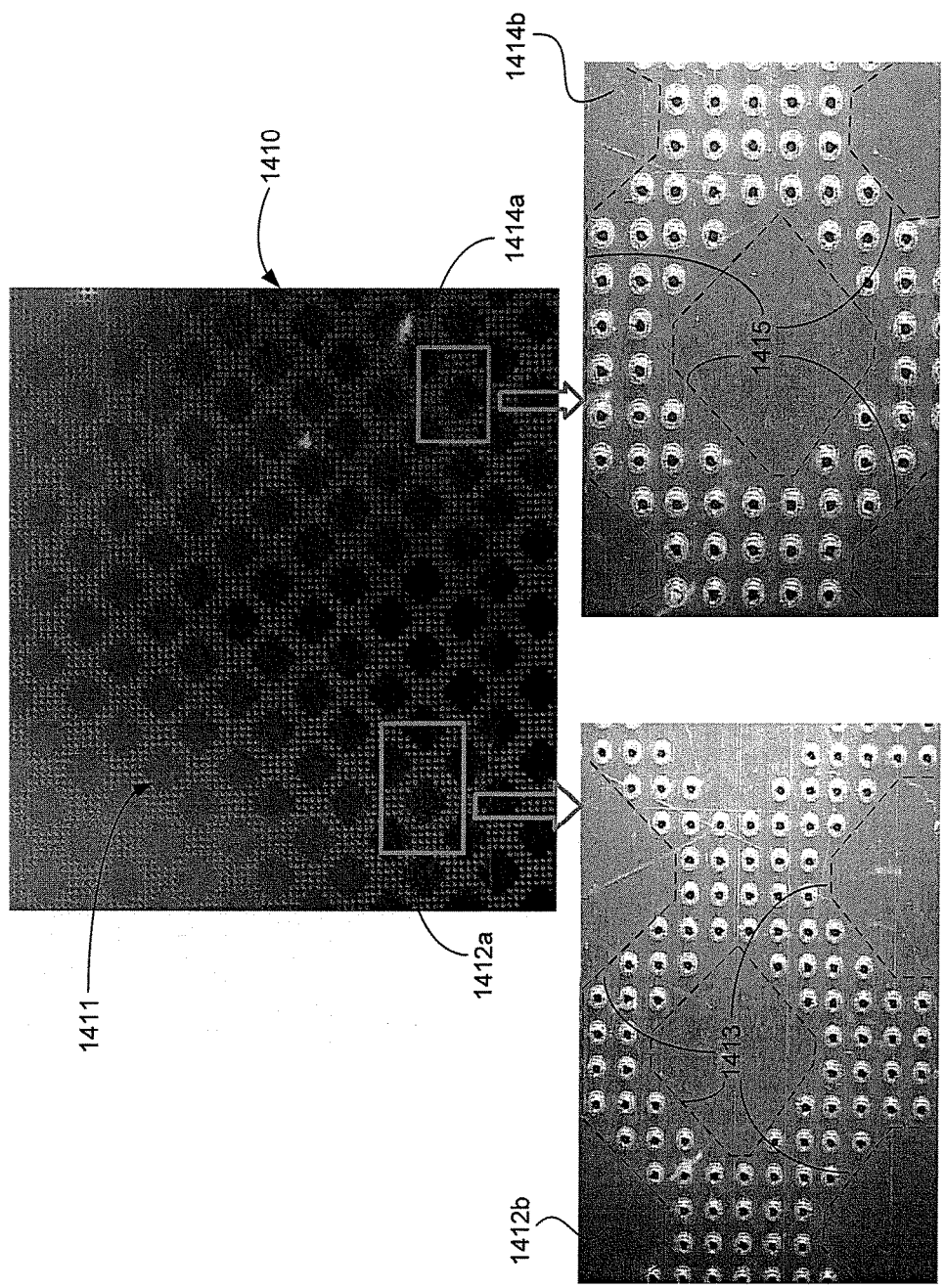
Figure 14C:
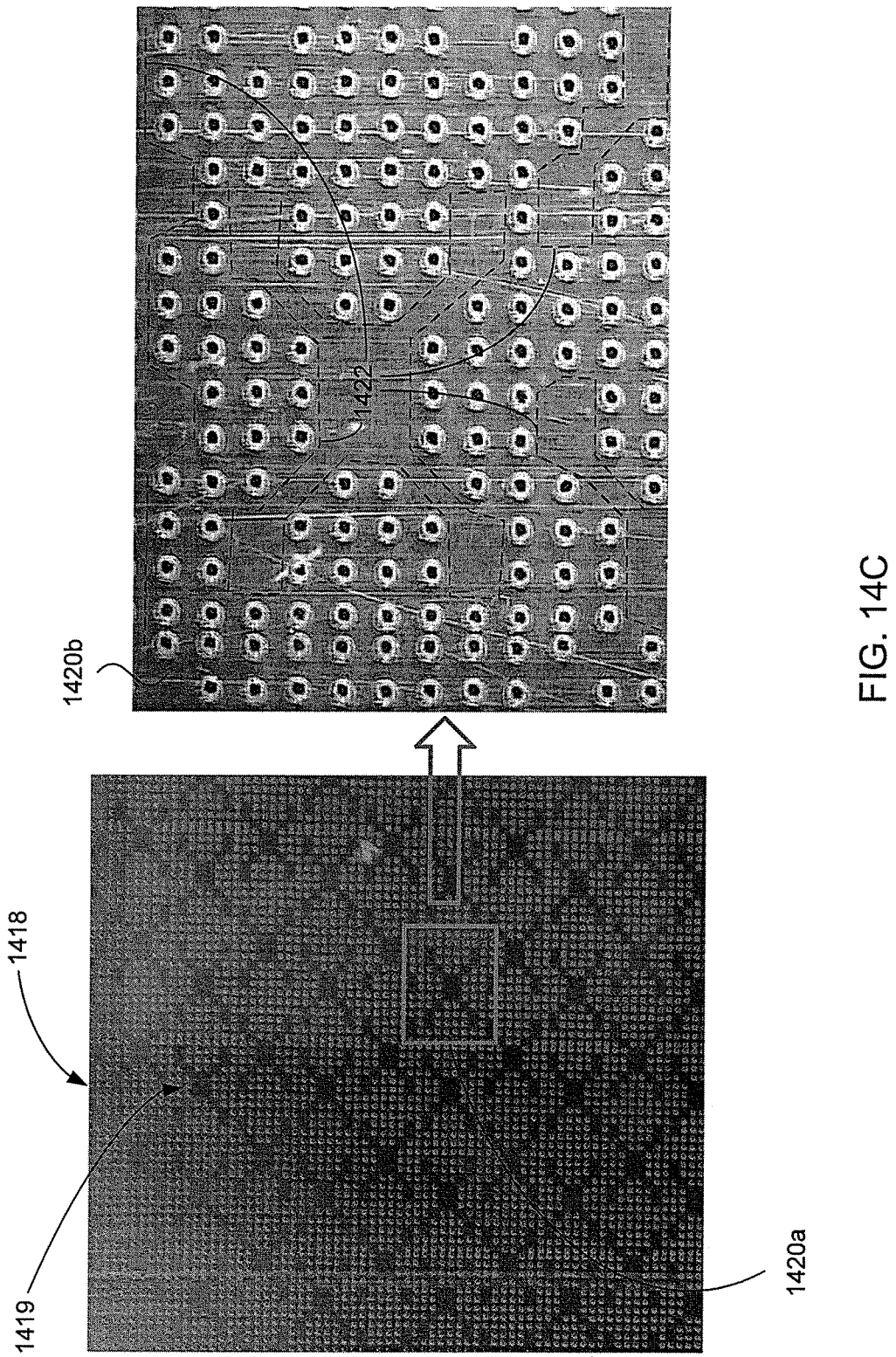

Similarly, FIGS. 14A-C illustrate exemplary images of fabrics, belts or sleeves having through voids drilled in various patterns according to the various aspects of the present invention. For example, fabric 1402 comprises through voids drilled in a manner that gives rise to the appearance of square diamond pattern 1403. A magnified image of region 1404a within fabric 1402 is depicted at 1404b. The dotted areas 1405 have been added to the magnified image 1404b in order to provide an enhanced visual perception of the drilled through hole pattern. Similarly, another magnified image corresponding to region 1406a within fabric 1402 is depicted at 1406b. The dotted area 1407 has also been added to magnified image 1406b in order to provide an enhanced visual perception of the drilled through hole pattern.

According to another example, fabric 1410 comprises through voids drilled in a manner that also gives rise to the appearance of a square diamond pattern 1411. A magnified image of region 1412a within fabric 1410 is depicted at 1412b. Dotted guide lines 1413 have been added to the magnified image 1412b in order to provide an enhanced visual perception of the drilled through hole pattern. Similarly, another magnified image corresponding to region 1414a within fabric 1410 is depicted at 1414b. Dotted guide lines 1415 have also been added to magnified image 1414b in order to provide an enhanced visual perception of the drilled through hole pattern.

According to yet another example, fabric 1418 comprises through voids drilled according to another pattern 1419. A magnified image of region 1420a within fabric 1418 is depicted at 1420b. Dotted guide lines 1422 have been added to the magnified image 1420b in order to provide an enhanced visual perception of the drilled through hole pattern. In short, the through voids or holes formed in the fabrics, belts or sleeves of the present invention can be separated by a planar land area, which may take any geometrical shape of a desired size. Although geometric shapes such as diamonds and squares are depicted in the present figures, these shapes are purely exemplary and the hole pattern may be modified to form practically any shape for the land areas, such as for example, parallelograms, triangles, circles, rectangles, floral, hexagonal or polygonal.

The inventive fabric, as noted earlier, may be used as a process belt or sleeve used in airlaid, melt blowing, spun-bonding, or hydroentangling processes. The inventive fabric, belt or sleeve may include one or more additional layers on top of or under the substrate formed using the material strips, merely to provide functionality, and not reinforcement. For example, the additional layers used may be any of woven or nonwoven materials, MD and/or CD yarn arrays, spirally wound strips of woven material that have a width less than the width of the fabric, fibrous webs, films, or a combination thereof, and may be attached to the substrate using any suitable technique known to one of ordinary skill in the art. Lamination by thermal bonding and chemical bonding are but a few examples.

Although a preferred embodiment of the present invention and modifications thereof have been described in detail herein, it is to be understood that this invention is not limited to this precise embodiment and modifications, and that other modifications and variations may be effected by one skilled in the art without departing from the spirit and scope of the invention as defined by the appended claims.

What is claimed is:

1. An industrial fabric for the production of nonwovens comprising a plurality of through voids, said through voids each comprising:
   a first opening associated with a top surface of said fabric, the top surface being a first outside surface of said fabric;
   a second opening associated with a bottom surface of said fabric, the bottom surface being a second outside surface of said fabric; and
   at least one raised edge circumferentially adjacent to at least one of said first and second openings, wherein said raised edge forms a continuous raised rim around said opening.

2. The fabric as claimed in claim 1, wherein each of said plurality of through voids includes a substantially conical or cylindrical shaped inner surface.

3. The fabric as claimed in claim 1, wherein said first raised edge is at a height level that is about 5-10 μm above said top surface.

4. The fabric as claimed in claim 1, wherein said second raised edge is at a height level that is about 5-10 μm below said bottom surface.

5. The fabric as claimed in claim 1, wherein said through voids are formed in a material strip forming one or more layers of said fabric.

6. The fabric as claimed in claim 5, wherein said material strip is a film, foil or a strip of nonwoven material.

7. The fabric as claimed in claim 6, wherein said film or foil comprises reinforcing fibers in MD, CD, or MD and CD, or in a random direction.

8. The fabric as claimed in claim 6, wherein said strip of nonwoven material is coated to enhance sheet release, and/or structural integrity.

9. A method of generating through voids in an industrial fabric as claimed in claim 1 used in the production of nonwovens, comprising:
   generating incident optical radiation for impacting said fabric; and
   controlling at least one characteristic associated with said incident optical radiation such that said incident optical radiation generates through voids that each include at least one raised edge circumferentially adjacent to an opening created on at least one of top and bottom surfaces associated with said fabric.

10. The method as claimed in claim 9, wherein each of said through voids includes a inner surface area of a substantially conical or cylindrical shape.

11. The method as claimed in claim 9, wherein said controlling of at least one characteristic associated with said incident optical radiation comprises generating through voids that each include a top surface opening that has a larger surface area than a bottom surface opening.

12. An industrial fabric used in the production of nonwovens comprising:
one or more spirally wound strips of polymeric material, wherein adjacent strips of said spirally wound strips of polymeric material are coupled, said spirally wound strips comprising a plurality of through voids each comprising:
a first opening associated with a top surface of said fabric, the top surface being a first outside surface of said fabric;
a second opening associated with a bottom surface of said fabric, the bottom surface being a second outside surface of said fabric; and
at least one raised edge circumferentially adjacent to at least one of said first and second openings, wherein said raised edge forms a continuous raised rim around said opening.

13. The fabric according to claim 12, further comprising:
one or more layers of woven or nonwoven materials, MD or CD yarn arrays, spirally wound strips of woven material having a width less than the width of the belt or sleeve, fibrous webs, films, or a combination thereof, wherein said one or more layers are formed on top of or under said spirally wound strips.

14. The fabric according to claim 12, wherein said plurality of through voids are drilled according to a predetermined pattern.

15. The fabric according to claim 12, wherein said adjacent strips are coupled using at least one of laser, infrared, and ultrasonic welding.

16. An industrial fabric used in the production of nonwovens comprising:
strips of polymeric material spirally wound such that adjacent strips of said polymeric material are coupled to form a belt; and
a plurality of through voids distributed over said formed belt, wherein said plurality of through voids comprise at least one raised edge circumferentially adjacent to at least one of a first and second opening associated with each of the plurality of distributed through voids, wherein said raised edge forms a continuous raised rim around said opening,
wherein the first opening is associated with a top surface of said fabric, and the second opening is associated with a bottom surface of said fabric, the top surface being a first outside surface of said fabric and the bottom surface being a second outside surface of said fabric.

17. The fabric according to claim 16, further comprising:
one or more layers of woven or nonwoven materials, MD or CD yarn arrays, spirally wound strips of woven material having a width less than the width of the belt or sleeve, fibrous webs, films, or a combination thereof, wherein said one or more layers are formed on top of or under said spirally wound strips.

18. The fabric according to claim 16, wherein said plurality of through voids are drilled according to a predetermined pattern.

19. The fabric according to claim 16, wherein said adjacent strips are coupled using at least one of laser, infrared, and ultrasonic welding.

20. The fabric as claimed in claim 1, wherein the fabric is a belt or sleeve used in airlaid, melt blowing, spunbonding, or hydroentangling process.

21. The fabric as claimed in claim 12, wherein the through voids are separated by land areas.

22. The fabric as claimed in claim 16, wherein the through voids are separated by land areas.

23. The fabric as claimed in claim 21, wherein the land area has a geometrical shape selected from the group consisting of diamond, square, rectangle, circle, parallelogram, hexagonal, floral and polygonal.

24. The fabric as claimed in claim 22, wherein the land area has a geometrical shape selected from the group consisting of diamond, square, rectangle, circle, parallelogram, hexagonal, floral and polygonal.

25. The fabric as claimed in claim 12, wherein the fabric is a belt or sleeve used in airlaid, melt blowing, spunbonding, or hydroentangling process.

26. The fabric as claimed in claim 16, wherein the fabric is a belt or sleeve used in airlaid, melt blowing, spunbonding, or hydroentangling process.

27. The fabric as claimed in claim 1, wherein the through voids are separated by land areas.

* * * * *